United States Patent
Ito

(10) Patent No.: US 8,792,182 B2
(45) Date of Patent: Jul. 29, 2014

(54) ZOOM LENS AND IMAGE PICKUP APPARATUS HAVING ZOOM LENS

(71) Applicant: Canon Kabushiki Kaisha, Tokyo (JP)

(72) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/761,466

(22) Filed: Feb. 7, 2013

(65) Prior Publication Data

US 2013/0208364 A1 Aug. 15, 2013

(30) Foreign Application Priority Data

Feb. 9, 2012 (JP) ................. 2012-026211

(51) Int. Cl.
*G02B 15/14* (2006.01)
*G02B 3/02* (2006.01)
*G02B 9/34* (2006.01)

(52) U.S. Cl.
USPC ............. 359/683; 359/64; 359/685; 359/686; 359/713; 359/714; 359/715; 359/740; 359/766; 359/773

(58) Field of Classification Search
USPC .......... 359/683–686, 713–715, 740, 766, 773
See application file for complete search history.

(56) References Cited

U.S. PATENT DOCUMENTS

| 6,594,087 | B2 | 7/2003 | Uzawa et al. |
| 7,304,805 | B2 | 12/2007 | Endo et al. |
| 7,679,837 | B2 * | 3/2010 | Souma .......................... 359/690 |
| 8,331,034 | B2 * | 12/2012 | Kimura ......................... 359/685 |
| 2012/0287312 | A1 * | 11/2012 | Kimura ......................... 359/683 |

FOREIGN PATENT DOCUMENTS

JP 2004-117826 A 4/2004

* cited by examiner

*Primary Examiner* — Evelyn A. Lester
(74) *Attorney, Agent, or Firm* — Canon USA Inc IP Division

(57) ABSTRACT

A zoom lens including a first lens unit having a positive refractive power, a second lens unit having a negative reflective power, a third lens unit having a positive refractive power, and a rear lens group including one or more lens units in this order from an object side to an image side, wherein distances between the respective lens units vary during the zooming operation, wherein the first lens unit consists of three lenses including one negative lens, and a partial dispersion ratio of a material for the negative lens of the first lens unit, an Abbe number of the same, a focal length of the entire system at a wide angle end and a focal length of the first lens unit are set individually and adequately.

15 Claims, 21 Drawing Sheets

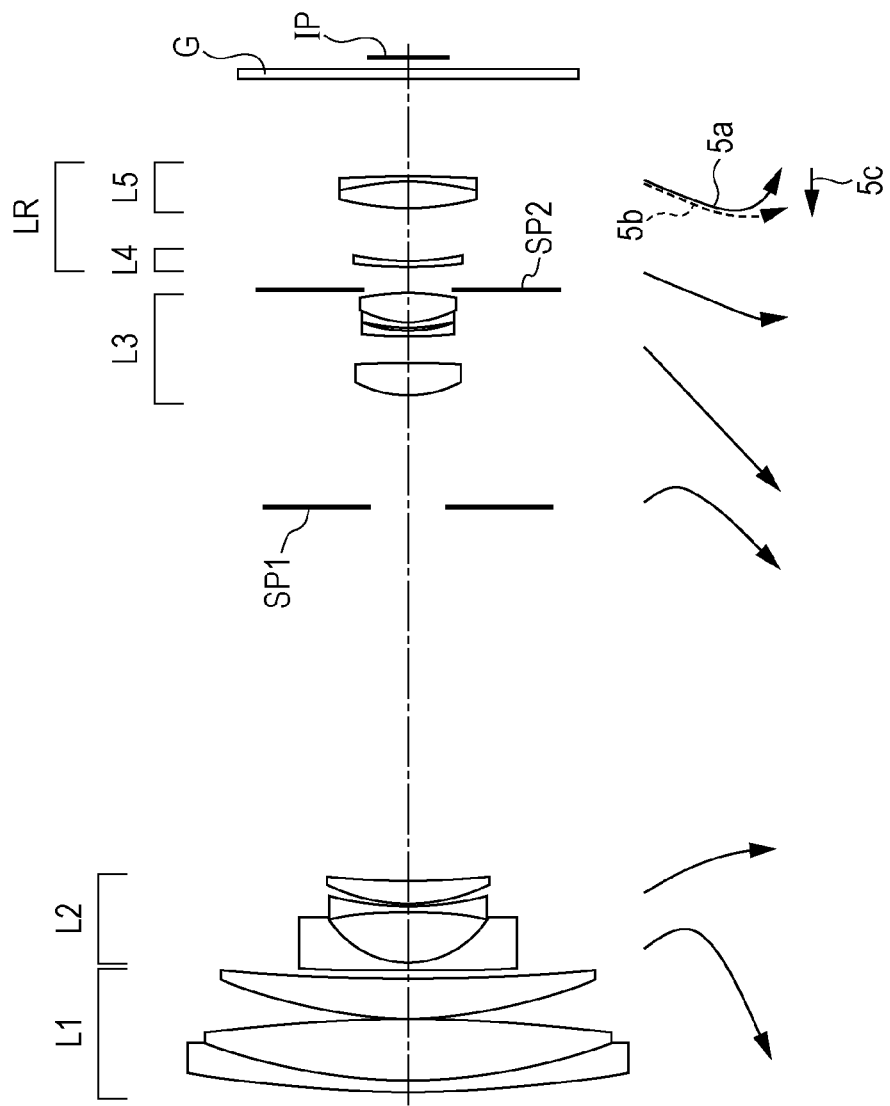

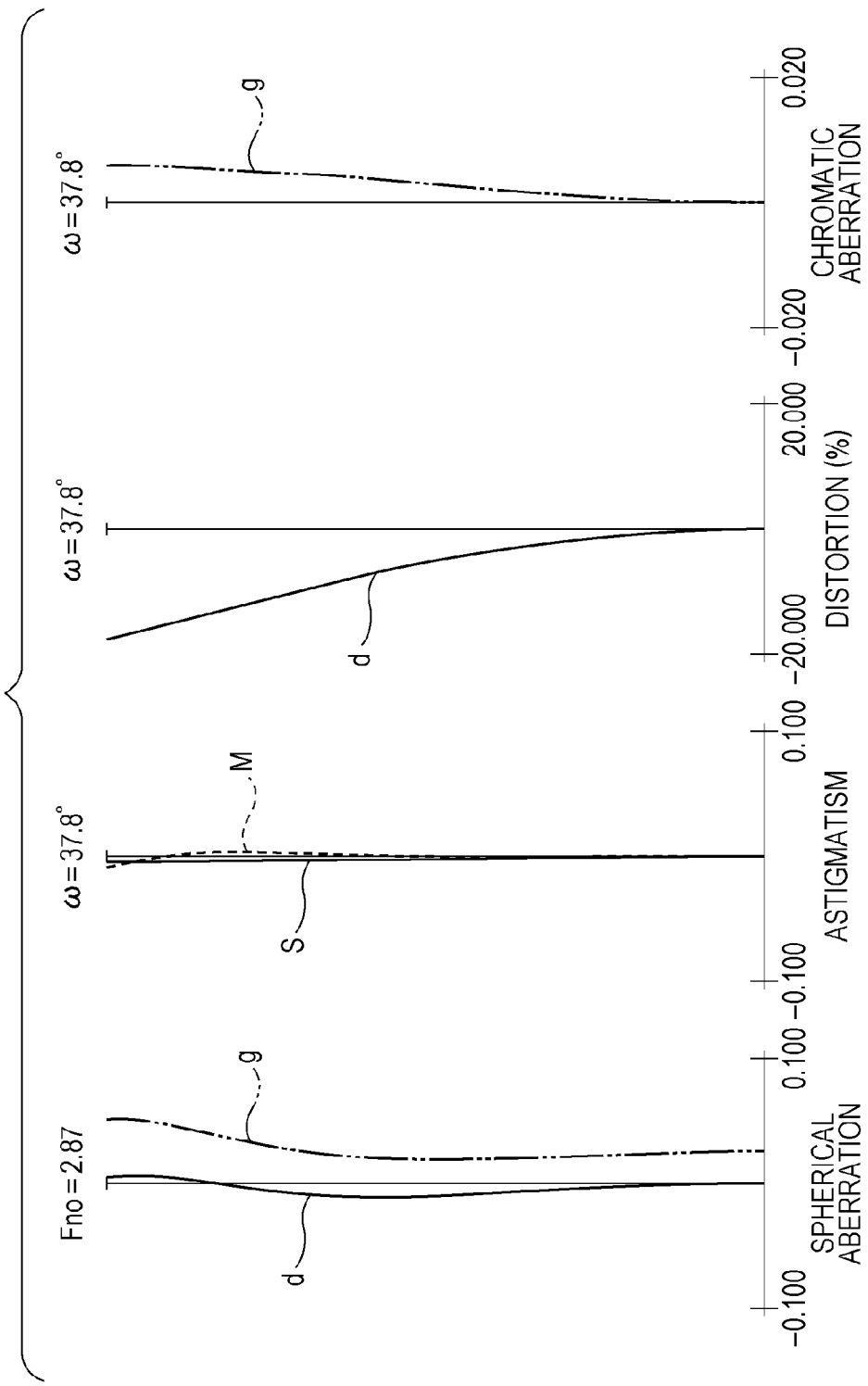

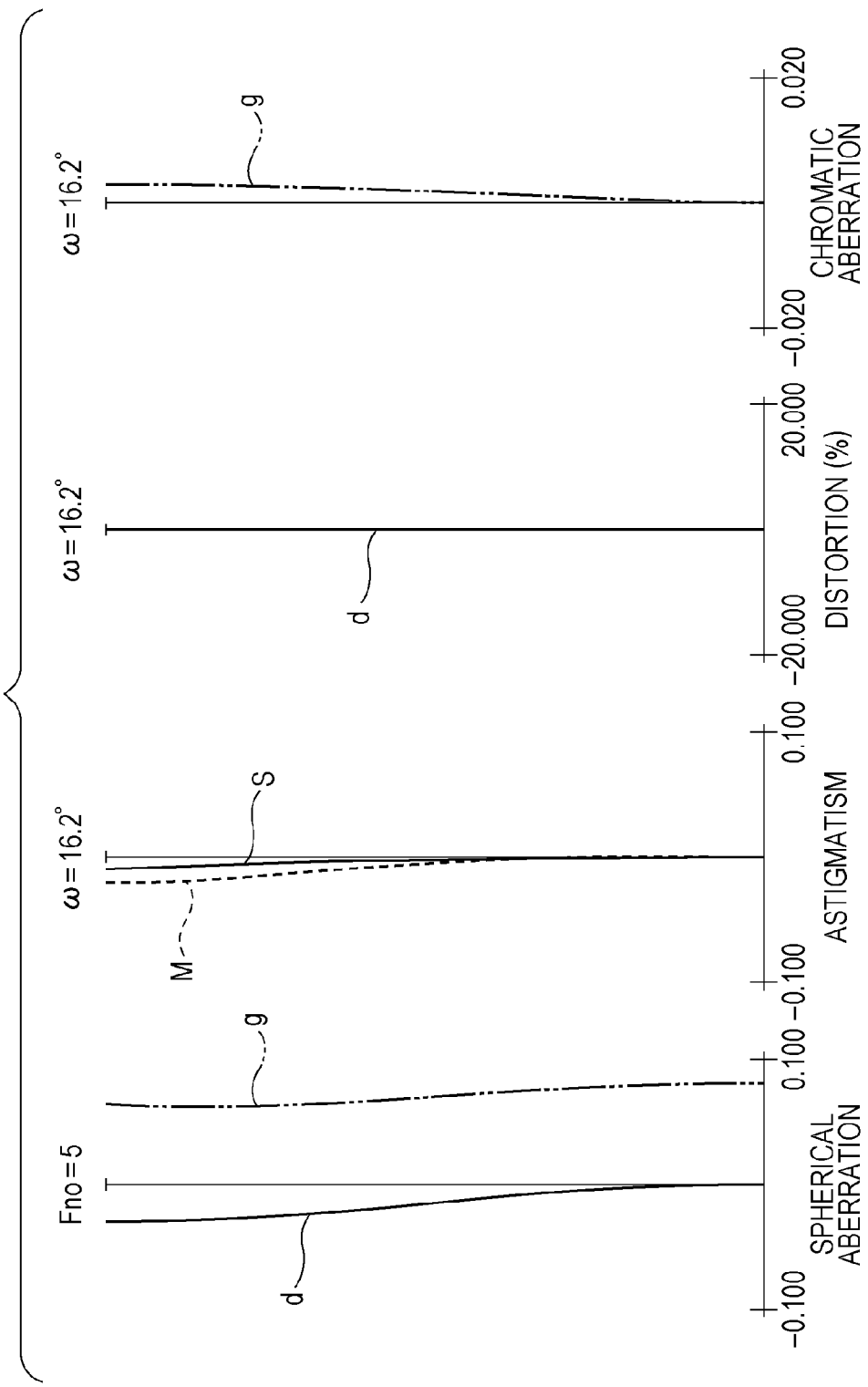

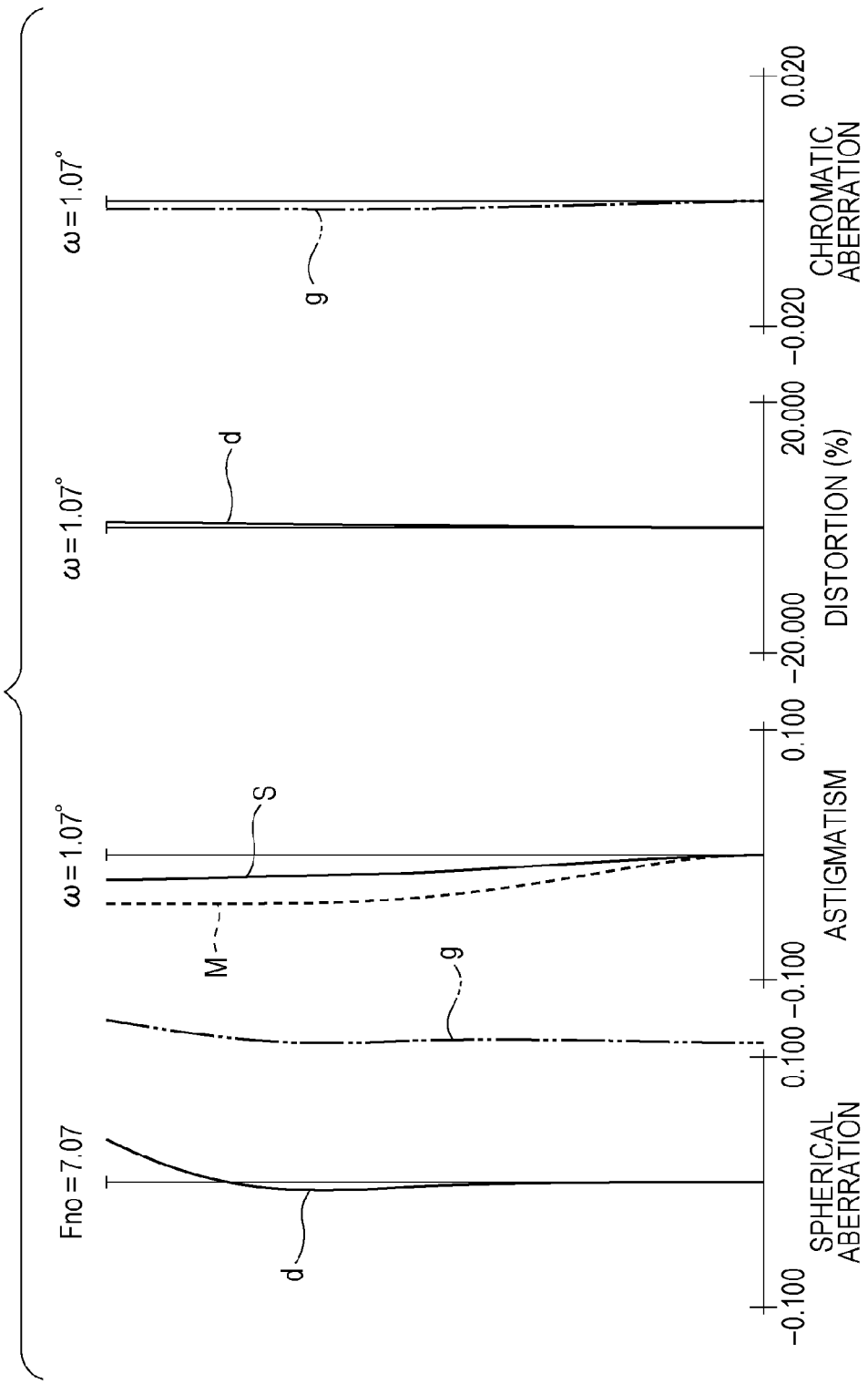

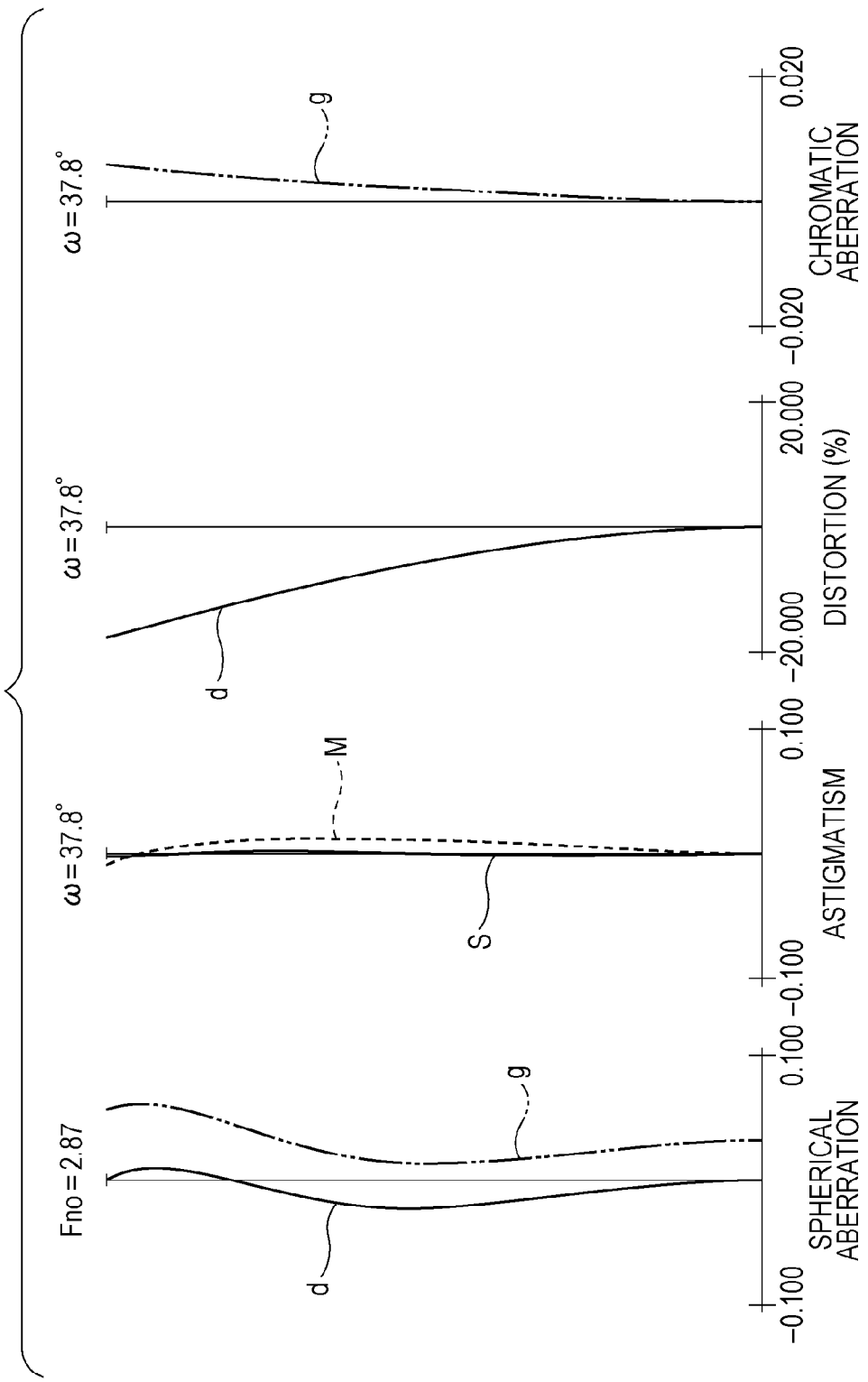

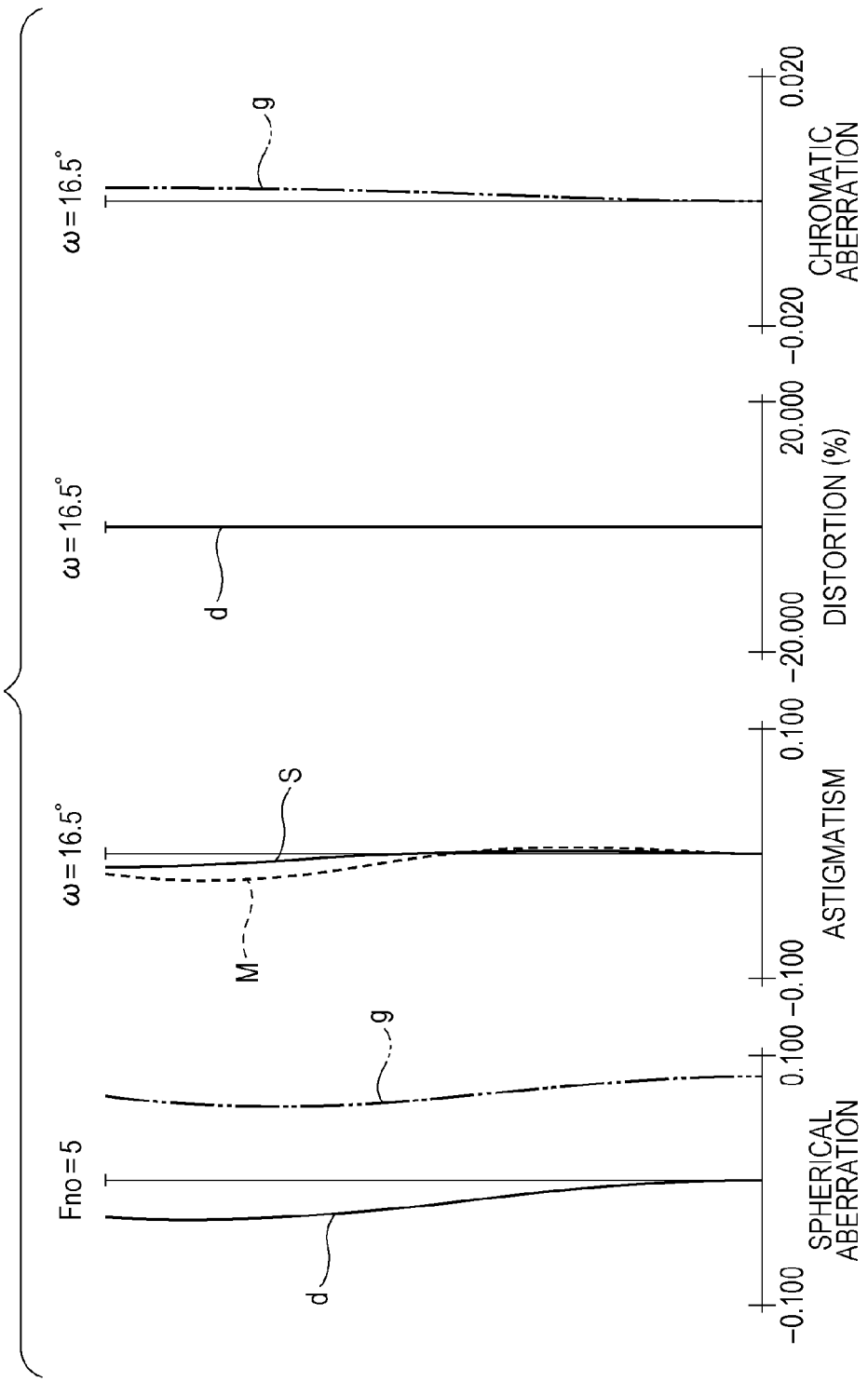

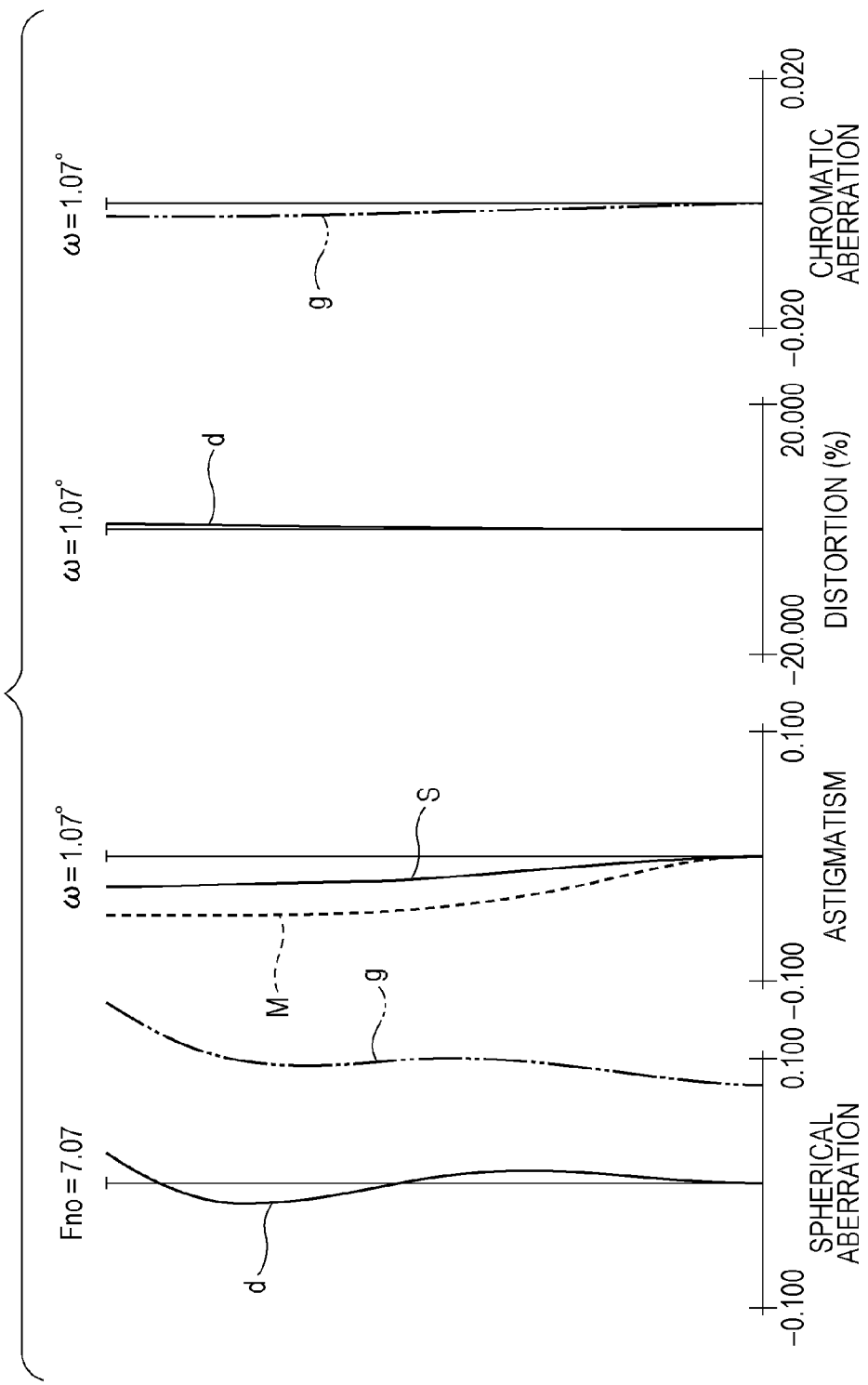

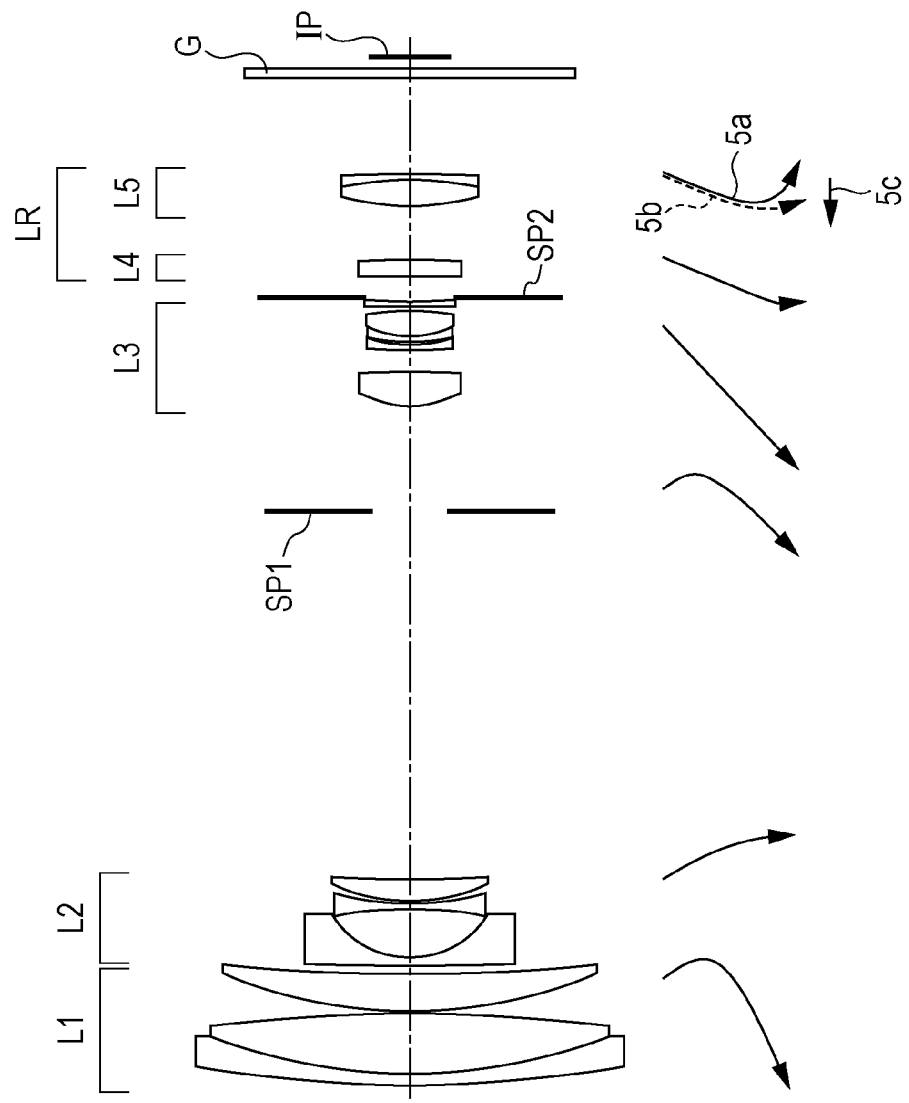

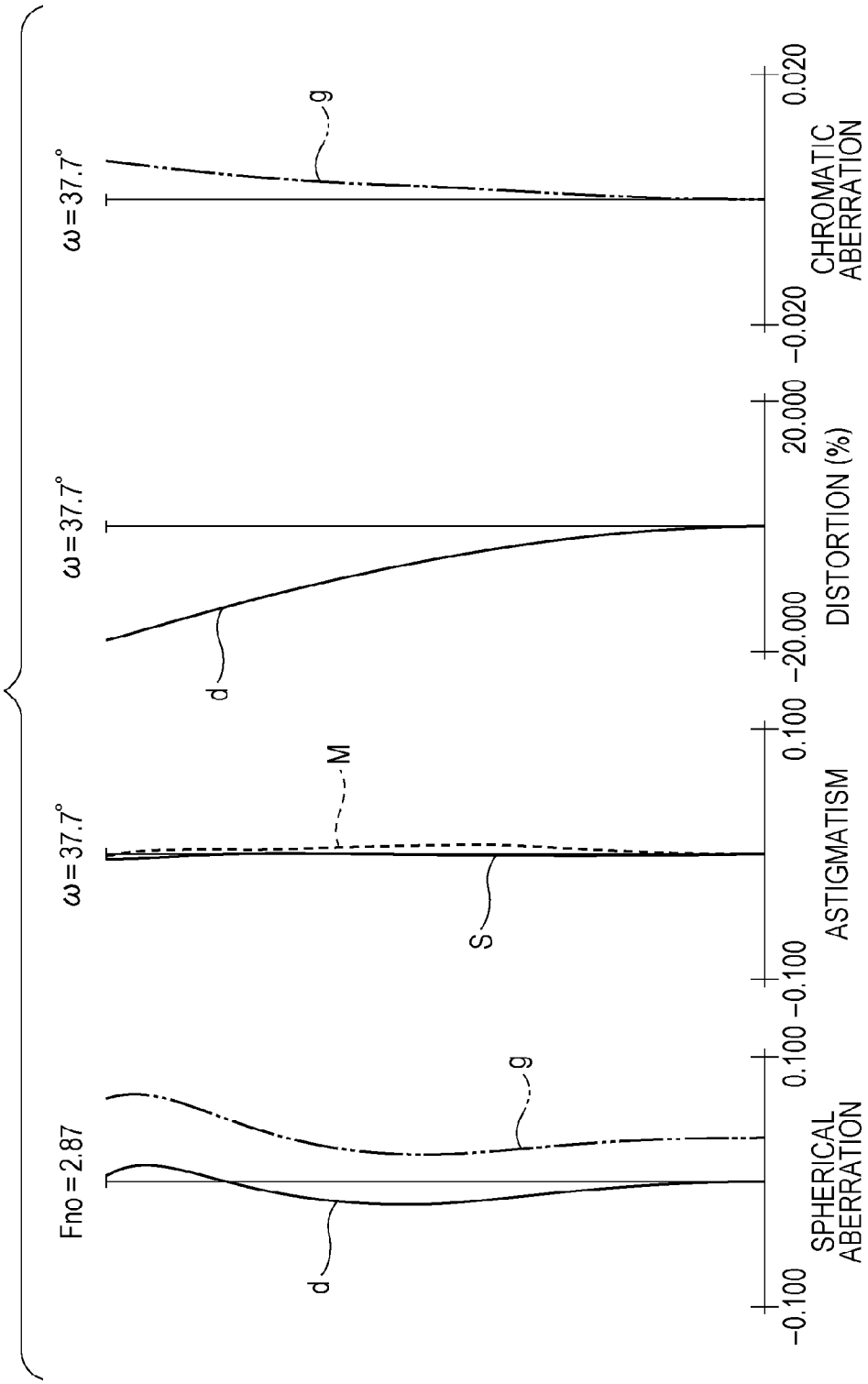

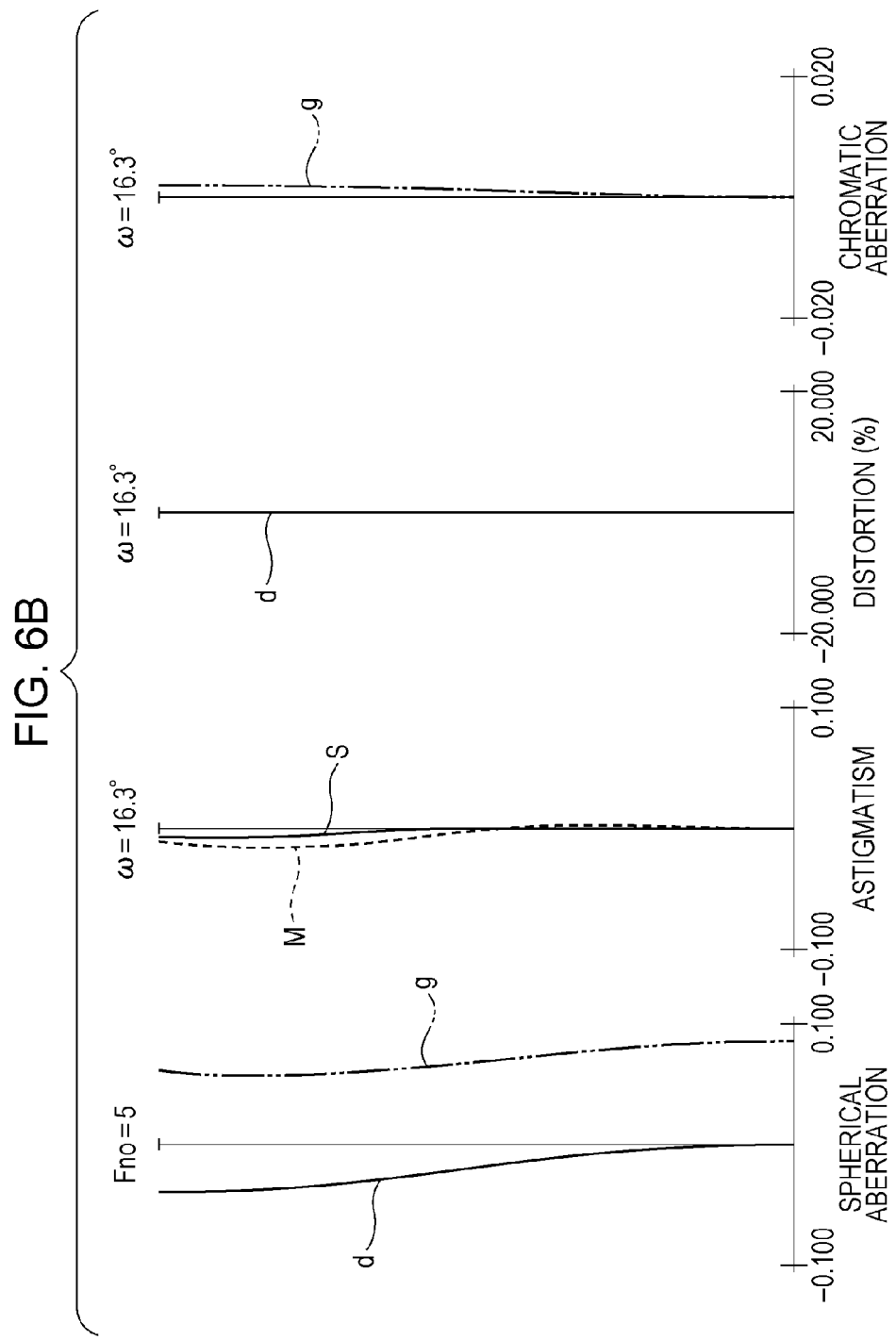

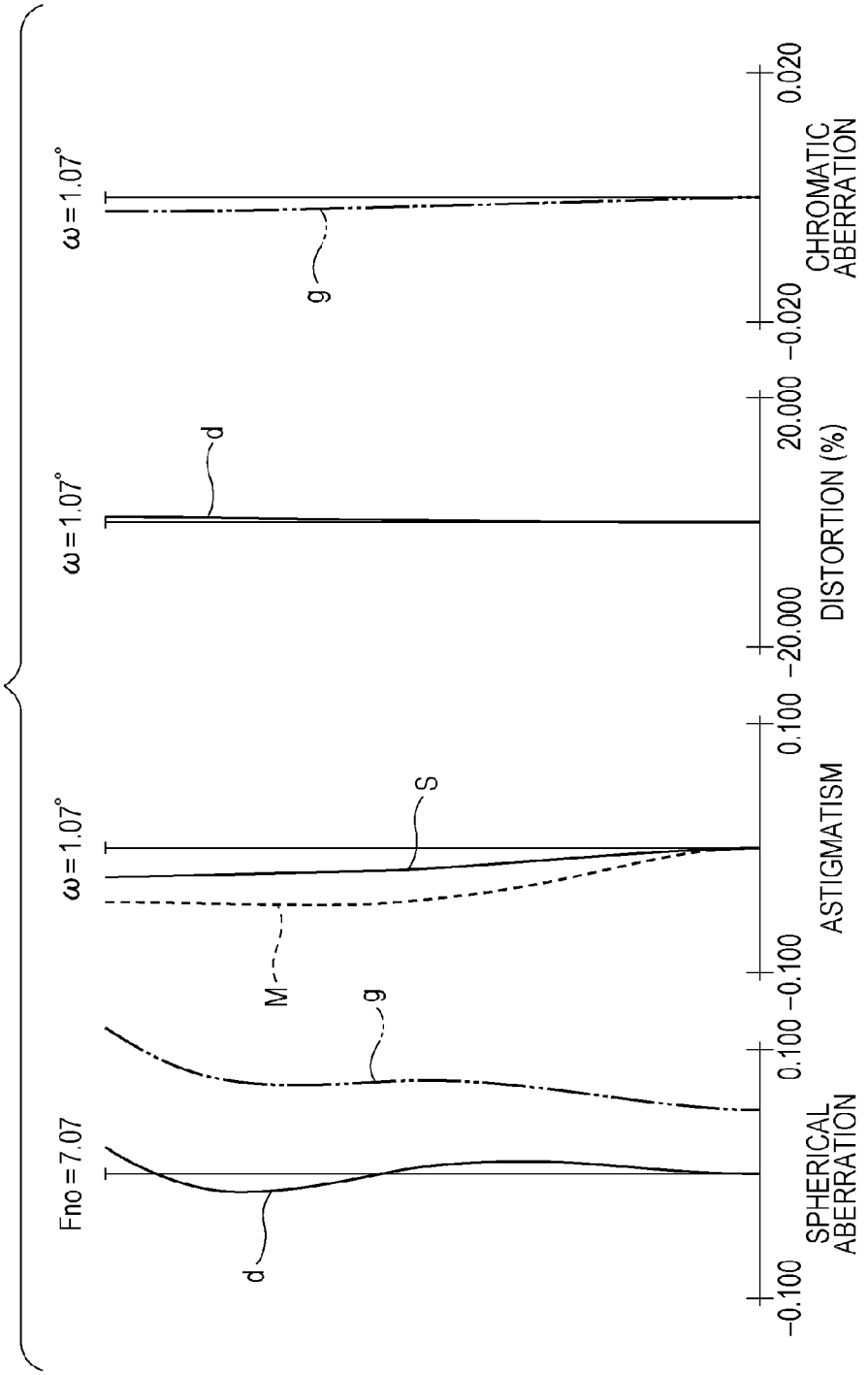

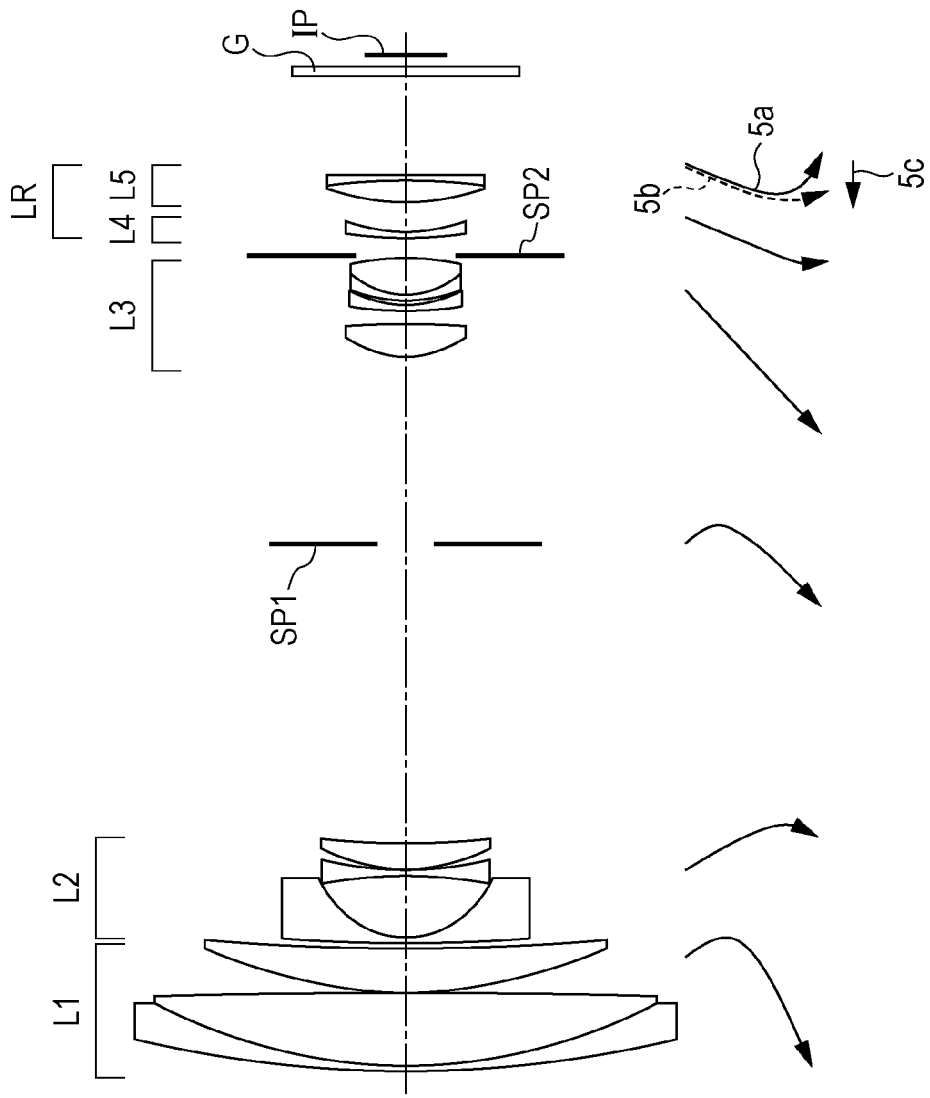

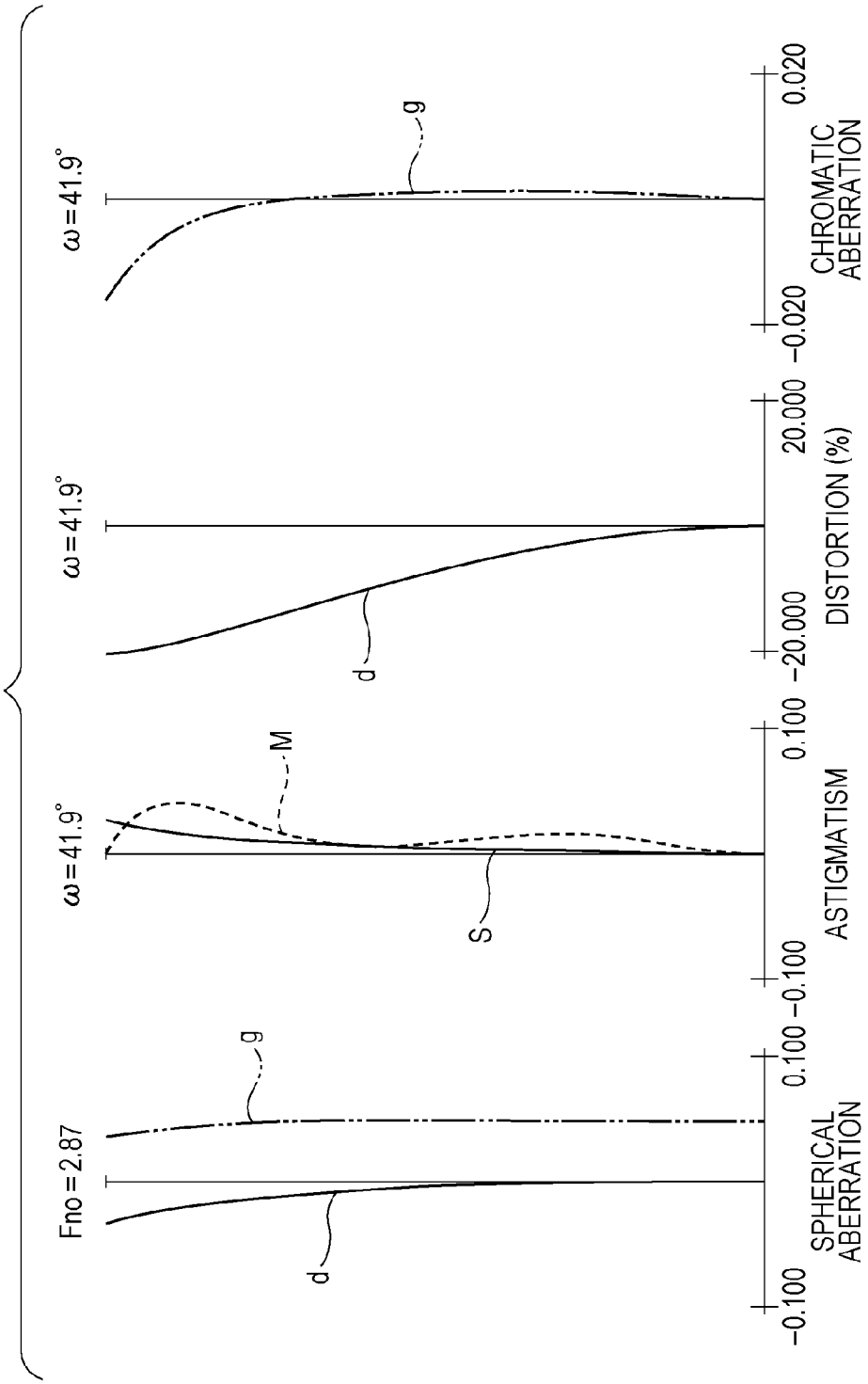

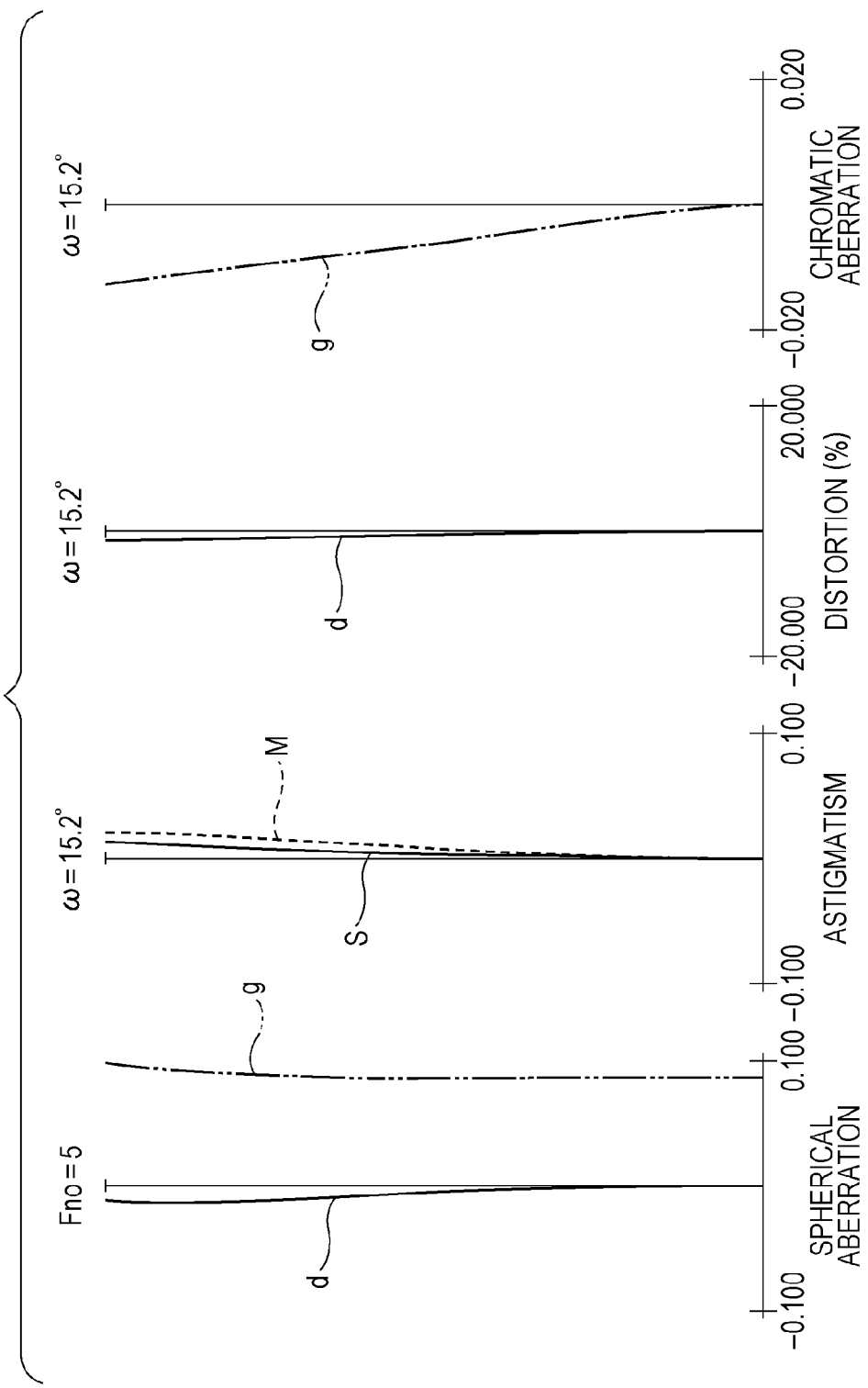

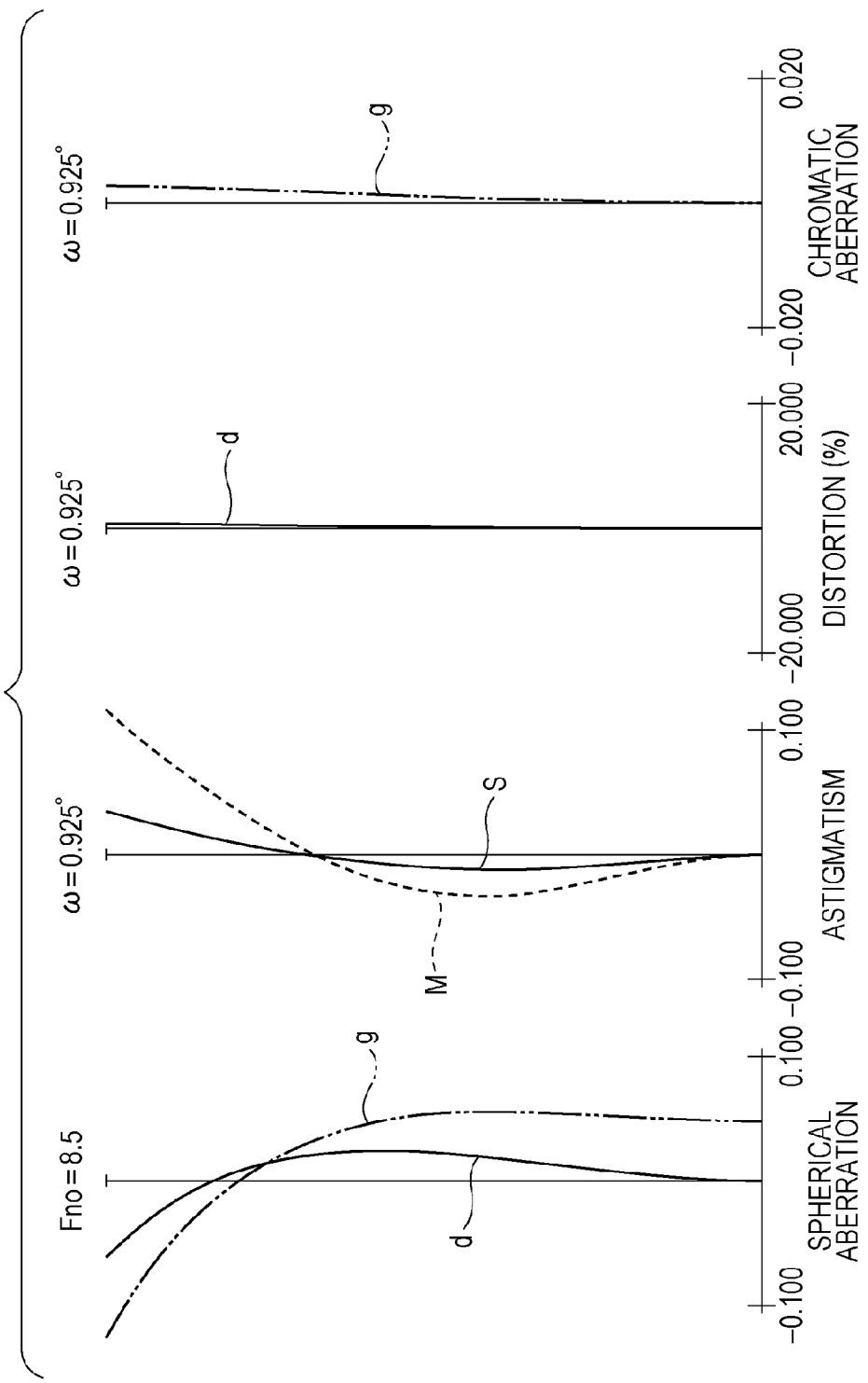

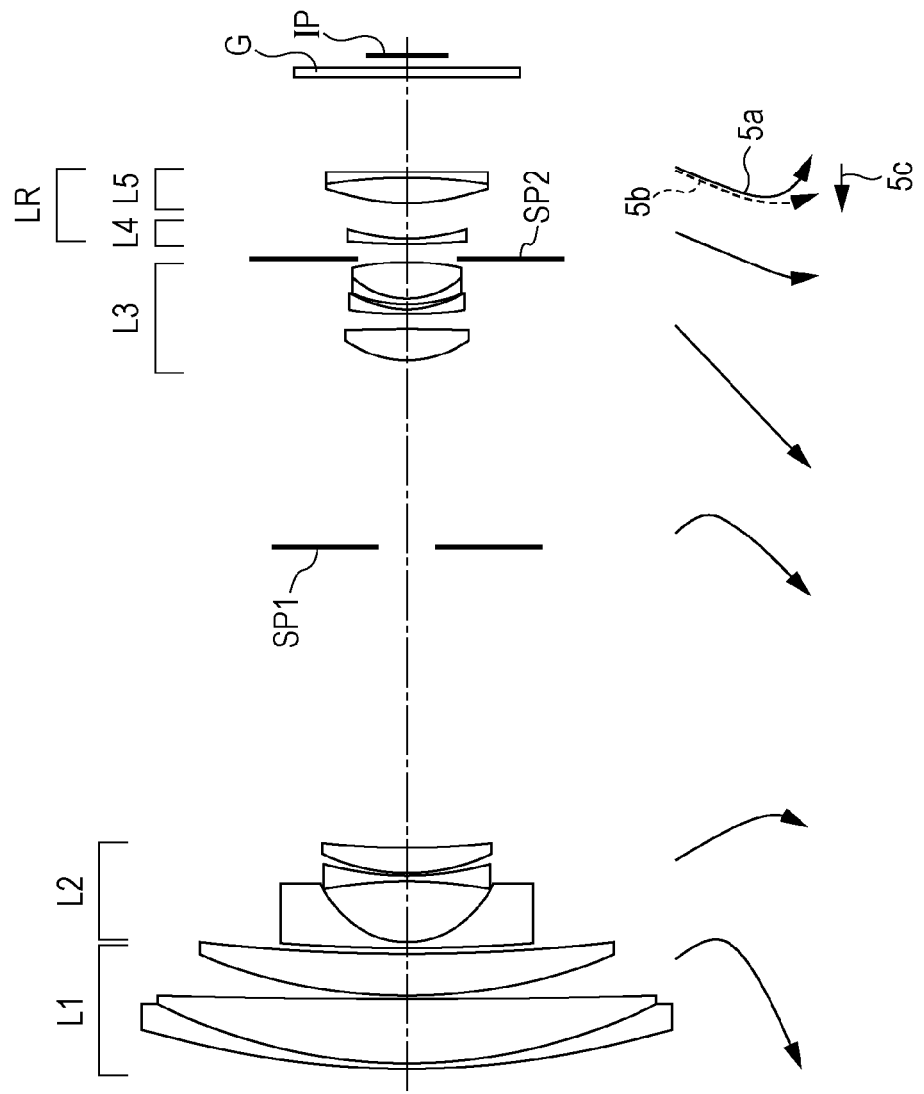

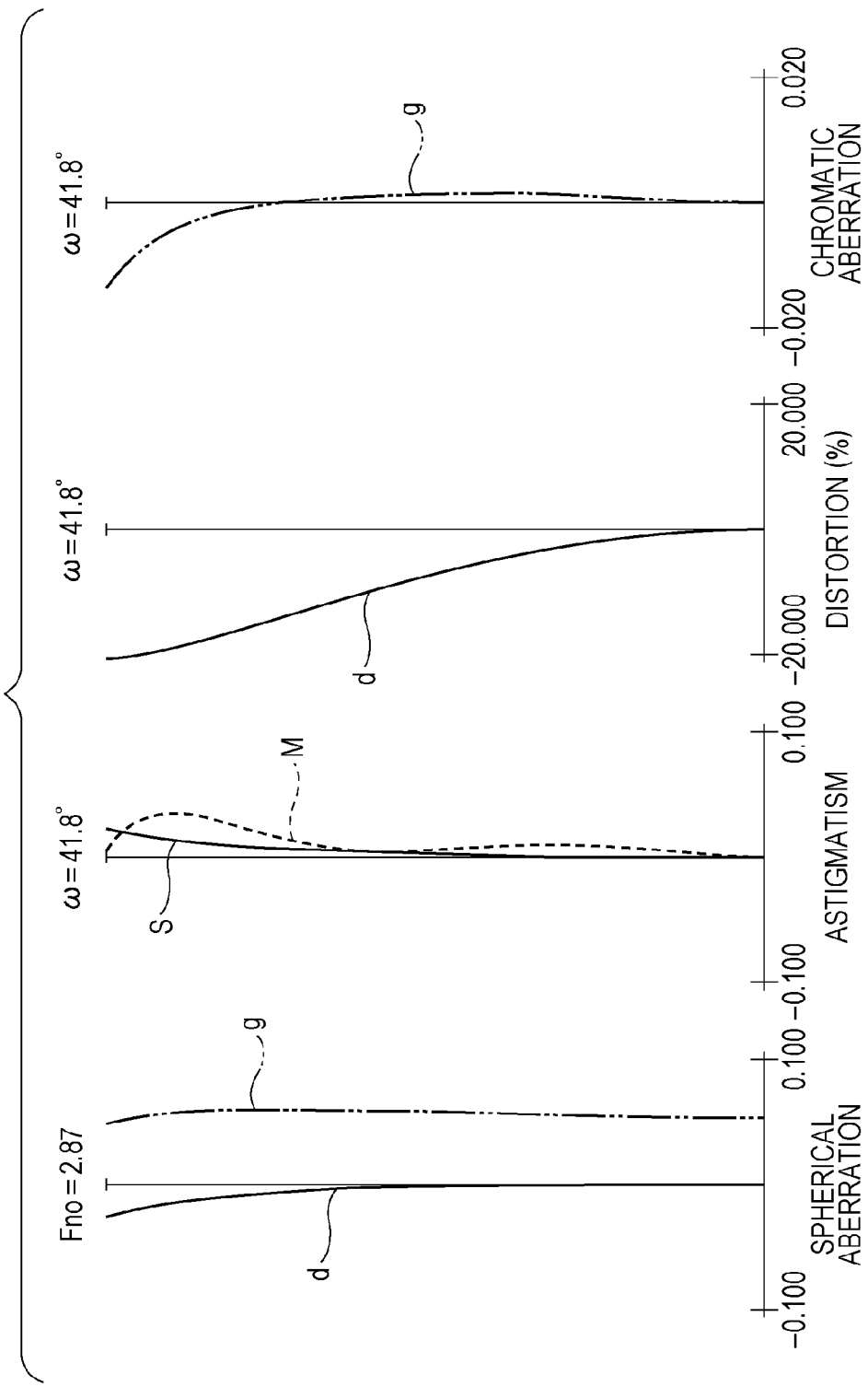

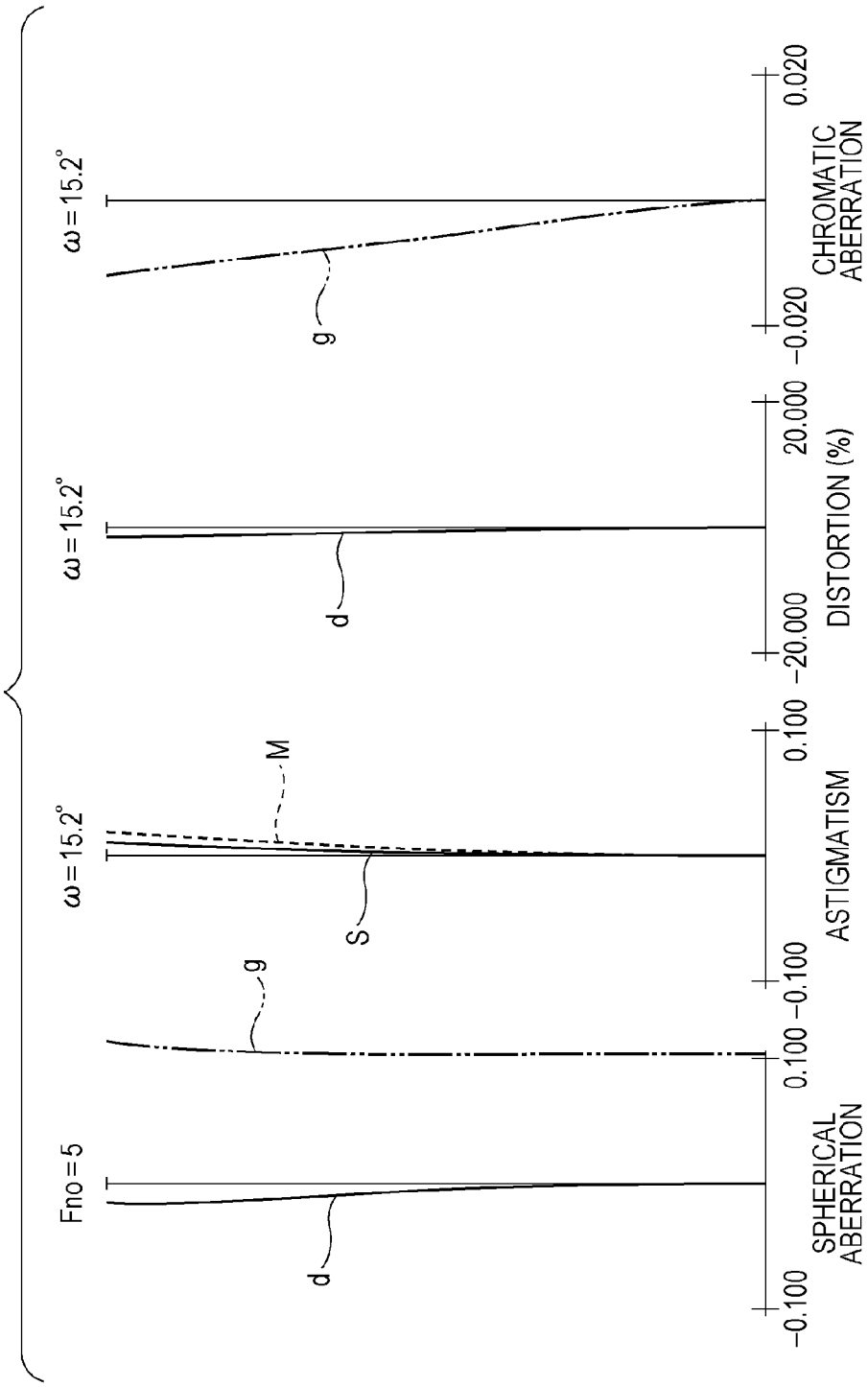

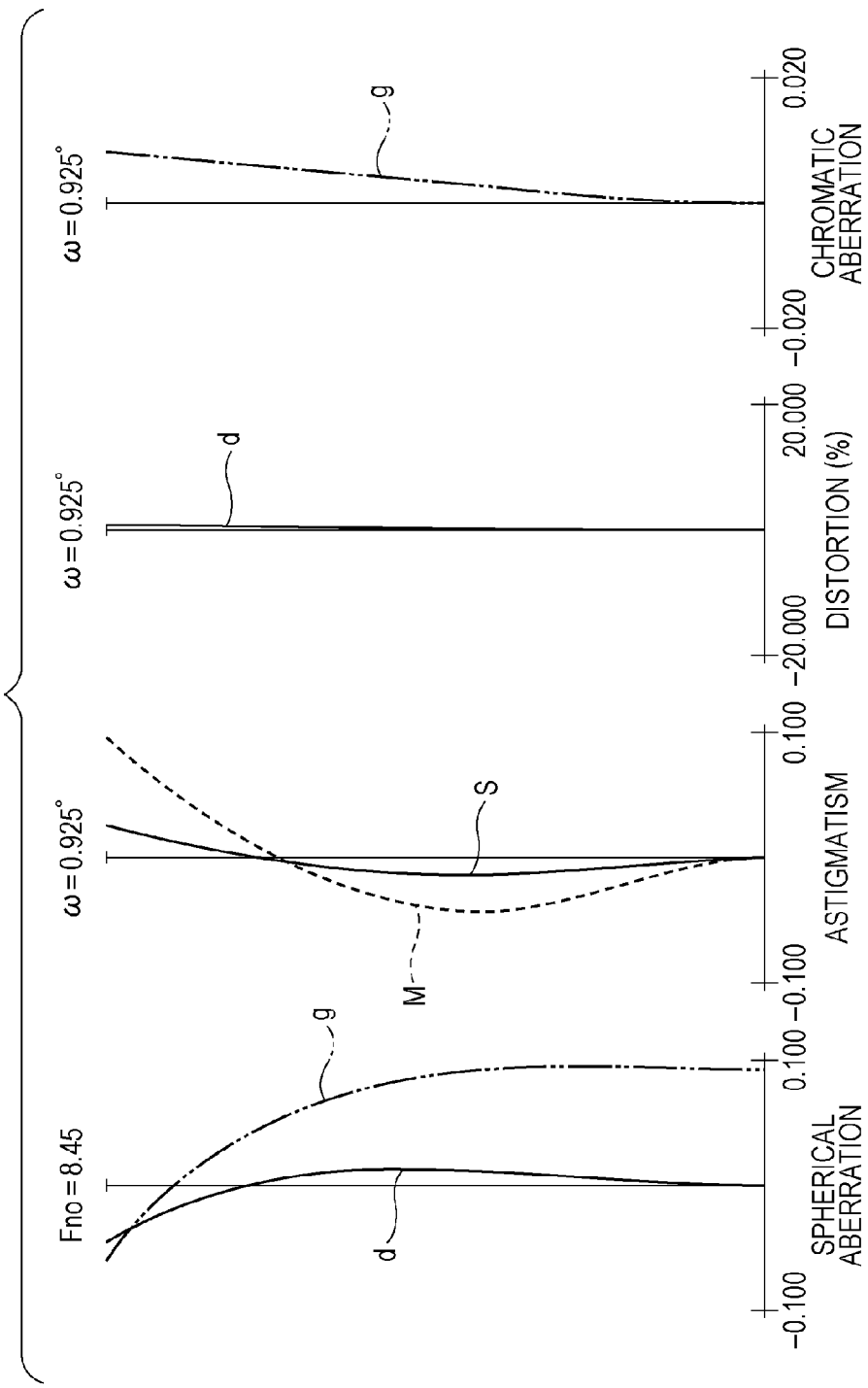

ZOOM LENS AND IMAGE PICKUP APPARATUS HAVING ZOOM LENS

BACKGROUND OF THE INVENTION

1. Field of the Invention

The present invention relates to a zoom lens and an image pickup apparatus having the zoom lens, and is suitable for an image pickup apparatuses using a solid-state image pickup device such as video cameras, electronic still cameras, broadcasting cameras, and monitoring cameras or image pickup apparatus such as cameras using silver-halide film.

2. Description of the Related Art

Photographic optical systems used in image pickup apparatuses are required to be a zoom lens having a short entire lens length, being compact, having a wide field angle, and having a high zoom ratio.

In particular, being a zoom lens having a high resolving power in which chromatic aberration is adequately corrected in addition to single-color aberration such as spherical aberration and coma aberration is required.

A positive-lead type zoom lens including a first lens unit having a positive refractive power, a second lens unit having a negative refractive power, a third lens unit having a positive refractive power, and a rear lens group including one or more lens units in this order from an object side to an image side is known.

As a positive-lead type zoom lens, a zoom lens having a zoom ratio on the order of 10 in which an anomalous dispersion material is used for lenses of the first lens unit to adequately correct chromatic aberration is known (U.S. Pat. No. 6,594,087).

As another type of a positive-lead type zoom lens, a zoom lens including four lens units having refractive powers of positive, negative, positive and positive in this order from the object side to the image side, and having a zoom ratio on the order of 96 and a photographic field angle at a wide angle end on the order of 62° is also known (U.S. Pat. No. 7,679,837).

Among zoom lenses including five lens units composed of lens units having refractive powers of positive, negative, positive, negative, and positive in this order from the object side to the image side, a zoom lens in which lenses formed of material having anomalous dispersion properties are used in the first lens unit is known (U.S. Pat. No. 7,304,805).

As another example, a zoom lens including five lens units having refractive powers of positive, negative, positive, positive, and positive, or refractive powers of positive, negative, positive, positive, and negative, or refractive powers of positive, negative, positive, negative, positive in these orders from the object side to the image side, having a zoom ratio on the order of 24 and a photographic field angle at a wide angle end on the order of 77° is also known (Japanese Patent Laid-Open No. 2004-117826).

The positive-lead type zoom lens is relatively easy to achieve a high zoom ratio while reducing the size of the entire system. Reduction of the size of the entire system of the positive-lead type zoom lens while maintaining a predetermined zoom ratio is achieved only by reducing the number of lenses while increasing the refractive powers (optical power=inverse of focal length) of the respective lens units which constitute the zoom lens. However, the zoom lens in this configuration suffers from a significant aberrational variation during a zooming operation and has a difficulty in obtaining high optical performance over an entire zoom range.

In addition, in order to secure a certain cut-end thickness in association with increase in refractive powers of the respective lens surfaces, the thickness of the lenses may increase. In particular, the front lens effective diameter is increased, and hence the reduction of the lens system as a whole may become insufficient. Furthermore, if an attempt is made to increase the zoom ratio in the positive-lead type zoom lens, a secondary spectrum of axial chromatic aberration may often be generated in a zoom area on the telephoto side. In the positive-lead type zoom lens, in order to obtain a high optical performance over the entire zoom range while trying to achieve a high zoom ratio, reduction of the chromatic aberration, specifically, the secondary spectrum is important.

In order to reduce the chromatic aberration and the secondary spectrum, it is effective to use a lens formed of a material having low dispersion properties and anomalous dispersion properties at an adequate position in the zoom lens. As regards the chromatic aberration, optimization of the respective lens units which constitute a zoom lens on the basis of material characteristics (Abbe number or partial dispersion ratio) is important.

In particular, in the positive-lead type zoom lens including four lens units or five lens units described above, a reduction of the secondary spectrum on the telephoto side becomes difficult when an attempt is made to achieve a high zoom ratio unless the first lens unit having a positive refractive power is set adequately. Consequently, achievement of a high optical performance over the entire zoom range becomes difficult.

In addition, adequate setting of imaging magnifications of the second and the third lens units and the lens units to be moved during the zooming operation as the refractive power of the third lens unit is important. Without setting these configurations adequately, obtainment of a zoom lens having a wide field angle, a high zoom ratio, and a high optical performance while achieving the reduction in size of the entire system becomes difficult.

SUMMARY OF THE INVENTION

An embodiment of the present invention provides a zoom lens capable of reducing generation of chromatic aberration at a telephoto end, having a high zoom ratio, and providing desirable optical characteristic over an entire zoom range, and an image pickup apparatus having the zoom lens.

A zoom lens including a first lens unit having a positive refractive power, a second lens unit having a negative refractive power, a third lens unit having a positive refractive power, and a rear lens group including one or more lens units in this order from an object side to an image side, wherein distances between the respective lens units vary during a zooming operation, wherein the first lens unit consists of three lenses including one negative lens, and where $\theta gF$ is a partial dispersion ratio of a material for the negative lens of the first lens unit, $vd$ is an Abbe number of the same, $fW$ is a focal length of the entire system at the wide angle end, and $f1$ is a focal length of the first lens unit, conditions of $35.0 < vd < 50.0$, $0.52 < \theta gF$, $\theta gF < -0.00203 \times vd + 0.656$, $18.1 < f1/fW < 27.8$ are satisfied.

Further features of the present invention will become apparent from the following description of exemplary examples with reference to the attached drawings.

BRIEF DESCRIPTION OF THE DRAWINGS

FIG. 1 is a cross-sectional view of a lens at a wide angle end of a zoom lens of Example 1.

FIG. 2A is an aberration chart at a wide angle end of Example 1.

FIG. 2B is an aberration chart at an intermediate zoom position of Example 1.

FIG. 2C is an aberration chart at a telephoto end of Example 1.

FIG. 4A is an aberration chart at a wide angle end of Example 2.

FIG. 4B is an aberration chart at an intermediate zoom position of Example 2.

FIG. 4C is an aberration chart at a telephoto end of Example 2.

FIG. 5 is a cross-sectional view of a lens at a wide angle end of a zoom lens of Example 3.

FIG. 6A is an aberration chart at a wide angle end of Example 3.

FIG. 6B is an aberration chart at an intermediate zoom position of Example 3.

FIG. 6C is an aberration chart at a telephoto end of Example 3.

FIG. 7 is a cross-sectional view of a lens at a wide angle end of a zoom lens of Example 4.

FIG. 8A is an aberration chart at a wide angle end of Example 4.

FIG. 8B is an aberration chart at an intermediate zoom position of Example 4.

FIG. 8C is an aberration chart at a telephoto end of Example 4.

FIG. 9 is a cross-sectional view of a lens at a wide angle end of a zoom lens of Example 5.

FIG. 10A is an aberration chart at a wide angle end of Example 5.

FIG. 10B is an aberration chart at an intermediate zoom position of Example 5.

FIG. 10C is an aberration chart at a telephoto end of Example 5.

DESCRIPTION OF THE EMBODIMENTS

Referring now to the attached drawings, preferred examples of the invention will be described in detail. A zoom lens of an embodiment of the invention includes a first lens unit having a positive refractive power (optical power=inverse of focal length), a second lens unit having a negative refractive power, a third lens unit having a positive refractive power, and a rear lens group including one or more lens units in this order from the object side to the image side. The lens units are configured to move so as to change the distances between the respective lens units during a zooming operation.

FIG. 1 is a cross-sectional view of a lens at a wide angle end (short focal length end) of a zoom lens of Example 1 of the invention. FIGS. 2A, 2B, and 2C are aberration charts of the zoom lens of Example 1 at the wide angle end, an intermediate zoom position, and a telephoto end (long focal length end), respectively. Example 1 is zoom lens having a zoom ratio of 48.4 and an aperture ratio on the order of 2.87 to 7.07.

Figure 3:
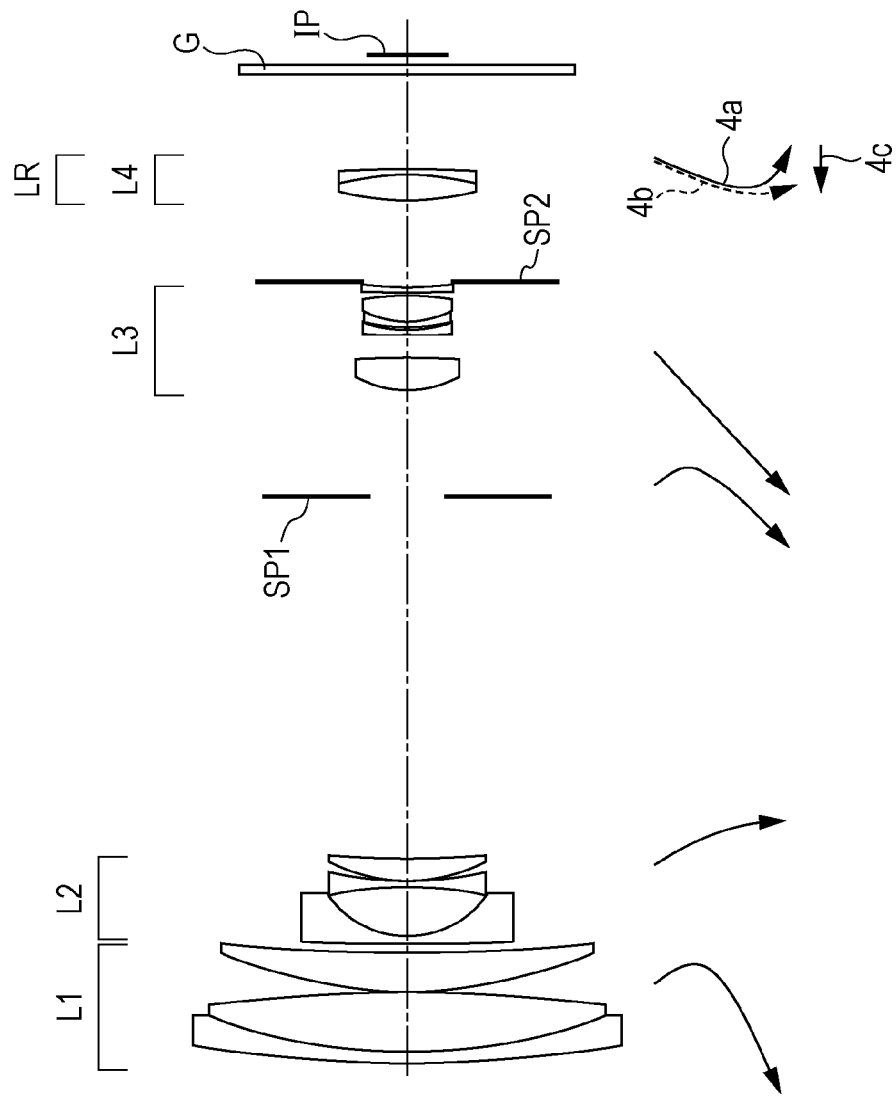
FIG. 3 is a cross-sectional view of a lens at a wide angle end of a zoom lens of Example 2.

FIG. 3 is a cross-sectional view of a lens at a wide angle end of a zoom lens of Example 2 of the invention. FIGS. 4A, 4B, and 4C are aberration charts of the zoom lens of Example 2 at the wide angle end, an intermediate zoom position, and a telephoto end, respectively. Example 2 is a zoom lens having a zoom ratio of 48.4 and an aperture ratio on the order of 2.87 to 7.07.

FIG. 5 is a cross-sectional view of a lens at a wide angle end of a zoom lens of Example 3 of the invention. FIGS. 6A, 6B, and 6C are aberration charts of the zoom lens of Example 3 at the wide angle end, an intermediate zoom position, and a telephoto end, respectively. Example 3 is a zoom lens having a zoom ratio of 48.3 and an aperture ratio on the order of 2.87 to 7.07.

FIG. 7 is a cross-sectional view of a lens at a wide angle end of a zoom lens of Example 4 of the invention. FIGS. 8A, 8B, and 8C are aberration charts of the zoom lens of Example 4 at the wide angle end, an intermediate zoom position, and a telephoto end, respectively. Example 4 is a zoom lens having a zoom ratio of 66.1 and an aperture ratio on the order of 2.87 to 8.5.

FIG. 9 is a cross-sectional view of a lens at a wide angle end of a zoom lens of Example 5 of the invention. FIGS. 10A, 10B, and 10C are aberration charts of the zoom lens of Example 5 at the wide angle end, an intermediate zoom position, and a telephoto end, respectively. Example 5 is a zoom lens having a zoom ratio of 66.0 and an aperture ratio on the order of 2.87 to 8.45.

Zoom lenses of the respective examples are image pickup lens systems used in image pickup apparatuses such as video cameras, digital still cameras, silver-halide film cameras, and TV cameras. The zoom lenses of the respective examples may be used as a projection optical system for projecting apparatuses (projectors). In cross-sectional views of the lenses, the left side is an object side (front side) and the right side is an image side (rear side). In the cross-sectional views of the lenses, assuming that reference sign i designates the order of the lens unit from the object side, reference sign Li designates an ith lens unit. Reference sign LR designates a rear lens group having one or more lens units.

Reference sign SP1 designates an aperture stop. Reference sign SP2 designates a flare-cut stop (mechanical stop). Reference symbol G designates an optical block corresponding to an optical filter, a face plate, a low-pass filter, an infrared ray cutting filter, and the like. Reference numeral IP designates an image plane. The image plane IP corresponds to an image plane of a solid-state image pickup device (photoelectric conversion device) such as a CCD sensor or a CMOS sensor when using the zoom lens as a photographic optical system such as a video camera, or a digital camera. When using the zoom lens as the photographic optical system of a silver-halide film camera, the image plane IP corresponds to a film surface.

Arrows indicate loci of movements of the respective lens units during the zooming operation (magnification varying) from the wide angle end to the telephoto end, and directions of movements of the lens units during a focusing operation. In spherical aberration diagrams, reference sign d designates a d-line (wavelength: 587.6 nm) and reference sign g designates a g-line (wavelength: 435.8 nm). In astigmatism diagrams, reference signs S and M designate a sagittal image plane and a meridional image plane on the d-line. Distortion aberration shown is that of the d-line. In the magnification chromatic aberration diagrams, the reference sign g designates a g-line. The wide angle end and the telephoto end in the respective examples described below mean zoom positions at which a lens unit for varying magnification is located at both ends of a movable range on the optical axis of the mechanism.

All of the above-described examples are zoom lenses having a first lens unit L1 having a positive refractive power, a second lens unit L2 having a negative refractive power, a third lens unit L3 having a positive refractive power, and the rear lens group LR including one or more lens units and having a positive refractive power as a whole in this order from the object side to the image side. The distances between the respective lens units vary during the zooming operation. The rear lens group LR includes a fourth lens unit L4 having a negative refractive power and a fifth lens unit having a positive refractive power in Examples 1, 4, and 5. In Example 2, the zoom lens includes a fourth lens unit L4 having a positive refractive power. In Example 3, the zoom lens includes a fourth lens unit L4 having a positive refractive power and a fifth lens unit L5 having a positive refractive power.

Subsequently, lens configurations of the receptive examples will be described. The zoom lens in Examples 1, 4, and 5 includes the lens units in the order shown below from the object side to the image side. That is, the zoom lenses of Examples 1, 4, and 5 each include a first lens unit L1 having a positive refractive power, a second lens unit L2 having a negative refractive power, an aperture stop SP1, a third lens unit L3 having a positive refractive power, a mechanical stop SP2, a fourth lens unit L4 having a negative refractive power, and a fifth lens unit L5 having a positive refractive power. During the zooming operation from the wide angle end to the telephoto end, the first lens unit L1 moves to follow a locus projecting to the image side, the second lens unit L2 moves to the image side, the third lens unit L3 and the fourth lens unit L4 moves to the object side, and the fifth lens unit L5 moves to the object side along a convex-shaped locus.

The zoom lenses of Examples 1, 4, and 5 are configured to principally vary magnification by the movements of the first lens unit L1, the second lens unit L2, and the third lens unit L3. The first lens unit L1 is configured to be capable of obtaining a large zoom ratio while reducing the entire lens length at the wide angle end by being moved to the object side during the zooming operation from the wide angle end to the telephoto end. The first lens unit L1 is configured to shorten the entire lens length in the intermediate zoom area by making a reciprocal locus moving to the image side once and then moving back to the object side during the zooming operation from the wide angle end to the telephoto end.

In this configuration, the effective area of the front lens effective diameter fixed in the intermediate zoom area is reduced to achieve an easy reduction in size of the front lens effective diameter. The second lens unit L2 is provided with a significant variable magnification effect by being configured to move so as to be positioned on the object side at the telephoto end in comparison with the wide angle end during the zooming operation. The third lens unit L3 is provided with a significant variable magnification effect by being configured to move so as to be positioned on the object side at the telephoto end in comparison with the wide angle end during the zooming operation.

A focus space (the amount of movement for focusing) of the fifth lens unit L5 for focusing is secured by configuring the fourth lens unit L4 to move to the object side at the telephoto end in comparison with the wide angle end during the zooming operation.

A rear-focusing system in which the fifth lens unit L5 is moved on an optical axis for performing the focusing operation is employed. Also, a reduction in size of the front lens effective diameter is achieved by moving the aperture stop SP1 independently (so as to follow a locus of movement different from other lens units) during the zooming operation from the wide angle end to the telephoto end. Also, the reduction in size of the front lens effective diameter when an attempt is made to widen the field angle by arranging the aperture stop SP1 on the object side at the wide angle end, and moving the aperture stop SP1 so as to follow a locus projecting to the image side during the zooming operation from the wide angle end to the telephoto end.

The mechanical stop SP2 has a constant aperture diameter, and moves integrally with the third lens unit L3 during the zooming operation, and effectively cuts a flare of an upper line of an off-axis ray during the zooming operation. Then, the fifth lens unit L5 is moved to correct an image plane variation in association with varying magnification and perform the focusing operation. By setting the locus of movement of the fifth lens unit L5 to follow a locus projecting to the object side during the zooming operation, the space between the fourth lens unit L4 and the fifth lens unit L5 is effectively utilized, and the entire lens length is effectively reduced.

In a cross-sectional view of the lens, a solid curved line 5a and a dotted curved line 5b relating to the fifth lens unit L5 are loci of movement for correcting the image plane variations in association with varying magnification when focusing on an object at infinity and a near object, respectively. When performing the focusing operation from the object at infinity to the near object at the telephoto end, the fifth lens unit L5 is moved forward (to the object side) as indicated by an arrow 5c.

The zoom lens of Example 2 includes a first lens unit L1 having positive refractive power, a second lens unit L2 having a negative refractive power, an aperture stop SP1, a third lens unit L3 having a positive refractive power, a mechanical stop SP2, and a fourth lens unit having a positive refractive power. During the zooming operation from the wide angle end to the telephoto end, the first lens unit L1 moves to follow a locus projecting to the image side, the second lens unit L2 moves to the image side, the third lens unit L3 moves to the object side, and the fourth lens unit L4 moves to the object side along a convex-shaped locus.

The zoom lens of Example 2, optical actions of the first lens unit L1, the second lens unit L2, and the third lens unit L3 are the same as those in Examples 1, 4, and 5. A rear-focusing system in which the fourth lens unit L4 is moved on an optical axis for performing the focusing operation is employed. Also, a reduction in size of the front lens effective diameter is achieved by moving the aperture stop SP1 independently during the zooming operation from the wide angle end to the telephoto end. Also, the reduction in size of the front lens effective diameter when an attempt is made to widen the field angle is achieved by arranging the aperture stop SP1 on the object side at the wide angle end, and moving the aperture stop SP1 so as to follow a locus projecting to the image side during the zooming operation.

The mechanical stop SP2 moves integrally with the third lens unit L3, and effectively cuts a flare of an upper line of the off-axis ray during the zooming operation. Then, the fourth lens unit L4 is moved to correct an image plane variation in association with varying magnification and perform the focusing operation. In the cross-sectional view of the lens, a solid curved line 4a and a dotted curved line 4b relating to the fourth lens unit L4 are loci of movement for correcting the image plane variations in association with varying magnification when focusing on an object at infinity and a near object, respectively. When performing the focusing operation from the object at infinity to the near object at the telephoto end, the fourth lens unit L4 is moved forward as indicated by an arrow 4c.

The zoom lens in Example 3 includes the lens units in the order shown below from the object side to the image side. That is, the zoom lens in Example 3 includes a first lens unit L1 having a positive refractive power, a second lens unit L2 having a negative refractive power, an aperture stop SP1, a third lens unit L3 having a positive refractive power, a mechanical stop SP2, a fourth lens unit L4 having a positive refractive power, and a fifth lens unit L5 having a positive refractive power.

During the zooming operation from the wide angle end to the telephoto end, the first lens unit L1 moves to follow a locus projecting to the image side, the second lens unit L2 moves to the image side, the third lens unit L3 and the fourth lens unit L4 moves to the object side, and the fifth lens unit L5 moves to the object side along a convex-shaped locus. Example 3 is different from Examples 1, 4, and 5 in sign of the refractive power of the fourth lens unit L4. In the zoom lens of Example 3, optical actions of the first lens unit L1 to the fifth lens unit L5 are the same as those in Examples 1, 4, and 5 described above. Optical actions of the aperture stop SP1 and the mechanical stop SP2 are also the same as those in Examples 1, 4, and 5.

In general, the optical characteristics of optical glass (optical material) is mapped on a graph having a vertical axis indicating a partial dispersion ratio θgF increasing upward, and a lateral axis indicating Abbe number increasing toward the left (hereinafter, referred to as "θgF-νd graph"). In such mapping, it is known that the optical material is distributed along a straight line referred to as a normal line (here, the partial dispersion ratio θgF is an amount expressed by θgF= (ng−fF)/(nF−nC) where ng is the refraction index of the g-line, nF is the refraction index of the F-line, and nC is the refraction index of a C-line).

In general, in the positive-lead type zoom lens having a long focal length, an axial ray passes a highest position in the first lens unit, the secondary spectrum of the axial chromatic aberration may be generated significantly. In the first lens unit, in order to correct the secondary spectrum of the axial chromatic aberration, it is effective to make the inclination, of a straight line connecting a positive lens and a negative lens which constitute the first lens unit, gentle in the θgF-νd graph.

For example, a material having a large Abbe number and being plotted in an area of the θgF-νd graph apart from the normal line in the direction in which the partial dispersion ratio θgF is increased such as fluorite is used as the positive lens in the first lens unit. Also, a material plotted in an area of the θgF-νd graph in the direction of in which the partial dispersion ratio θgF is reduced from the normal line such as lanthanum system material is used as the negative lens of the first lens unit. With the combination described above, the inclination of the straight line connecting the materials of the positive lens and the negative lens in the first lens unit becomes significantly gentler than the normal line, whereby desirable correction of the secondary spectrum of the axial chromatic aberration is easily achieved.

However, it is difficult to obtain a high optical performance over the entire zoom range only by using such a material for the zoom lens. In order to achieve a high zoom ratio and the reduction in size of the entire lens system by using the lens formed of materials plotted in the area apart from the normal line, it is necessary to set a zoom type, refractive powers of the respective lens units, reflecting powers of the lenses of the respective lens units, and a lens configuration adequately. In particular, in order to achieve the high zoom ratio while making an attempt to reduce the size of the entire system with the positive-lead type zoom lens, setting of the refraction index, the Abbe number and the like of the material of the lenses of the first lens unit adequately is important.

In the respective examples, the secondary spectrum of the axial chromatic aberration caused by an attempt to achieve the high zoom ratio is desirably corrected and the high optical performance is obtained over the entire zoom range by using the material plotted in the area in the θgF-νd graph significantly apart from the normal line adequately for the first lens unit.

Subsequently, in the zoom lenses of the respective examples, preferable conditions for obtaining a compact zoom lens having a wide field angle, a high zoom ratio, and a high optical performance will be described. In the respective examples, the first lens unit L1 is composed of three lenses including one negative lens. In the following relational expressions, θgF is the partial dispersion ratio of the material for the negative lens of the first lens unit L1, νd is an Abbe number of the same, fW is a focal length of the entire system at the wide angle end, and f1 is a focal length of the first lens unit L1.

At this time, conditions as $$35.0 < \nu d < 50.0 \tag{1}$$

$$0.52 < \theta gF \tag{2}$$

$$\theta gF < -0.00203 \times \nu d + 0.656 \tag{3}$$

$$18.1 < f1/fW < 27.8 \tag{4}$$

are satisfied.

Subsequently, the technical meanings of the conditional expressions (1) to (4) will be described. When the Abbe number of the material of the negative lens is increased beyond an upper limit value of the conditional expression (1), the curvature of a cemented lens surface of a cemented lens in the first lens unit L1 is increased in order to correct the chromatic aberration. When the curvature of the cemented lens surface is increased, the cut-end of the lens is decreased. Therefore, when considering the processing conditions of the lens, it is necessary to increase the lens thickness. When the lens thickness is increased, the front lens effective diameter is increased when an attempt is made to widen the field angle, so that a reduction in size of the entire system becomes difficult.

When the Abbe number of the material of the negative lens is decreased beyond the lower limit value of the conditional expression (1), the curvature of the cemented lens surface is reduced, which is advantageous for reduction in size of the entire system. However, materials existing on the lower side of the normal line in the θgF-νd graph are not many.

In the respective examples, the first lens unit L1 has a very important role for the correction of aberration in the positive lead zoom lens. The aberration generated in the first lens unit L1 is enlarged by degrees corresponding to the lateral magnifications of the respective lens units from the first lens unit L1 onward until the image plane. Therefore, the aberration generated in the first lens unit L1 needs to be minimized. When reducing the axial chromatic aberration generated by increase in zoom ratio, the gentler the inclination of the straight line connecting glass materials of the negative lens and the positive lens in the first lens unit L1 in the θgF-νd graph, the more the secondary spectrum of the axial chromatic aberration is corrected.

The conditional expressions (2) and (3) determine the partial dispersion ratio θgF of the material of the negative lens in the first lens unit L1. In the θgF-νd graph, the materials existing in the area where the partial dispersion ratio θgF becomes smaller beyond the lower limit value of the conditional expression (2) are not many, and hence better correction of the chromatic aberration becomes difficult. When the partial dispersion ratio θgF is increased beyond the upper limit value of the conditional expression (3), the inclination of the straight line connecting the glass materials of the negative lens and the positive lens cannot be made gentle and hence the secondary spectrum of the axial chromatic aberration remains significantly, so that obtainment of the high optical performance while achieving the high zoom ratio becomes difficult.

The conditional expression (4) determines the focal length of the first lens unit L1. When the focal length is decreased beyond the lower limit value of the conditional expression (4), the power (the inverse of the focal length) of the first lens unit L1 becomes too strong, and hence the correction of the spherical aberration at the telephoto end becomes difficult. Correction of the spherical aberration is achieved by increasing the number of the lenses. However, if the number of the lenses increase, the effective diameter of the first lens unit L1 is increased, which is not preferable for increasing the field angle.

When the focal length L1 is increased beyond the upper limit value of the conditional expression (4), the power of the first lens unit L1 becomes weak, and hence the correction of the spherical aberration is advantageously performed. However, if the power becomes too weak, it is not favorable because the amount of movement during the zooming operation from the wide angle end to the telephoto end of the first lens unit L1 is increased and hence the entire system is increased in size.

As described above, according to the respective examples, a zoom lens which is compact in entire optical system, has a wide field angle and a high zoom ratio, and achieves a high optical performance over the entire zoom range is obtained.

In the respective examples, it is further preferable that one or more of the conditions described below is satisfied. In the relational expressions given below, $\beta 2W$ is a lateral magnification of the second lens unit L2 at the wide angle end and $\beta 2T$ is a lateral magnification of the second lens unit L2 at the telephoto end. Also, $\beta 3W$ is a lateral magnification of the third lens unit L3 at the wide angle end and $\beta 3T$ is a lateral magnification of the third lens unit L3 at the telephoto end, f3 is a focal length of the third lens unit L3, and nd is a refraction index of the material of the negative lens of the first lens unit L1.

The aperture stop SP1 is provided between the second lens unit L2 and the third lens unit L3. The distance between the lens surface of the second lens unit L2 on the image side and the aperture stop SP1 at the wide angle end is defined as D2, and the distance between the aperture stop SP1 and the lens surface of the third lens unit L3 on the object side at the wide angle end is defined as D3.

At this time, it is preferable that one or more of the following conditional expressions are satisfied.

$$2.8<(\beta 2T \cdot \beta 3W)/(\beta 2W \cdot \beta 3T)<6.5 \quad (5)$$

$$1.75<nd<2.10 \quad (6)$$

$$3.5<f3/fW<6.5 \quad (7)$$

$$1.0<D2/D3<5.0 \quad (8)$$

Subsequently, the technical meanings of the conditional expressions (5) to (8) described above will be described.

The conditional expression (5) defines a share of zoom ratio between the second lens unit L2 and the third lens unit L3. The axial ray follows an optical path such as being condensed by a positive refractive power of the first lens unit L1, dispersing by a negative refractive power of the second lens unit L2, and being condensed again by a positive refractive force of the third lens unit L3. Therefore, the incident height of the axial ray is the highest at the first lens unit L1 followed by the third lens unit L3. When the share of zoom ratio is decreased beyond the lower limit value of the conditional expression (5), the share of zoom ratio of the third lens unit L3 becomes too large, and hence the amount of movement of the third lens unit L3 caused by the zooming operation is increased. It is unfavorable because the variations in axial chromatic aberration are increased.

When the share of zoom ratio is increased beyond the upper limit value of the conditional expression (5), the share of zoom ratio of the third lens unit L3 is reduced. Accordingly, the amount of movement of the third lens unit L3 due to the share of zoom ratio is reduced, and the variations in axial chromatic aberration are reduced. However, the share of zoom ratio becomes too small and hence the achievement of the high zoom ratio becomes difficult.

The conditional expression (6) defines the refraction index of the material of the negative lens of the first lens unit L1. When the refraction index is increased beyond the upper limit value of the conditional expression (6), the curvature of the cemented lens surface of the cemented lens in the first lens unit L1 becomes gentle and hence a reduction in size is easily performed. However, the amount of existing glass is too small and hence the correction of the chromatic aberration becomes difficult. When the refraction index is decreased beyond the lower limit value in the conditional expression (6), the curvature of the cemented lens surface of the cemented lens in the first lens unit L1 is increased, and hence the thickness of the lens is increased, so that the size of the entire system is increased.

The conditional expression (7) defines the refractive power of the third lens unit L3. When the focal length of the third lens unit L3 is increased beyond the upper limit value of the conditional expression (7), the refractive power of the third lens unit L3 becomes too small and hence the amount of movement of the third lens unit L3 caused by the zooming operation is increased. As a consequence, the entire lens length is increased, and the reduction in size of the entire system becomes difficult. Also, when the focal length of the third lens unit L3 is decreased beyond the lower limit value of the conditional expression (7), the refractive power of the third lens unit L3 becomes too large and hence the amount of movement of the third lens unit L3 caused by the zooming operation is decreased, which is advantageous for reducing the size of the entire system. However, correction of the spherical aberration or the coma aberration in the third lens unit L3 becomes difficult.

In order to correct the various aberration at this time, it is necessary to increase the number of lenses, then, the size of the entire system is increased, which is not preferable.

The conditional expression (8) defines the distance between the second lens unit L2 and the aperture stop SP1 and the distance between the third lens unit L3 and the aperture stop SP1 at the wide angle end. When the distance between the third lens unit L3 and the aperture stop SP1 is increased beyond the lower limit value of the conditional expression (8), variations in incident height of the off-axis ray passing through the second lens unit L2 is reduced. Then, the size of the outer diameter of the lenses of the first lens unit L1 may be decreased, so that the reduction in size of the entire system is easily achieved. However, since the incident height of the off-axis ray passing through the third lens unit L3 is increased, the coma aberration is generated significantly from the third lens unit L3 onward.

When the distance between the third lens unit L3 and the aperture stop SP1 is decreased beyond the upper limit value of the conditional expression (8), the incident height of the off-axis ray passing through the first lens unit L1 is increased, and hence the size of the first lens unit L1 is increased.

In the respective examples, it is preferable to set the ranges of the numeric values of the conditional expressions (1a) to (8a) as shown below.

$$35.1 < \nu d < 49.8 \quad (1a)$$

$$0.53 < \theta gF \quad (2a)$$

$$\theta gF < -0.00203 \times \nu d + 0.655 \quad (3a)$$

$$18.4 < f1/fW < 27.6 \quad (4a)$$

$$2.9 < (\beta 2T \cdot \beta 3W)/(\beta 2W \cdot \beta 3T) < 6.3 \quad (5a)$$

$$1.75 < nd < 2.00 \quad (6a)$$

$$4.0 < f3/fW < 6.0 \quad (7a)$$

$$1.2 < D2/D3 < 4.5 \quad (8a)$$

Further preferably, when the range of the numerical values of the conditional expressions (1b) to (8b) as shown below, the effects meant by the respective conditional expressions described above are obtained to a maximum extent.

$$35.2 < \nu d < 49.7 \quad (1b)$$

$$0.54 < \theta gF \quad (2b)$$

$$\theta gF < -0.00203 \times \nu d + 0.65419 \quad (3b)$$

$$18.5 < f1/fW < 27.5 \quad (4b)$$

$$3.0 < (\beta 2T \cdot \beta 3W)/(\beta 2W \cdot \beta 3T) < 6.0 \quad (5b)$$

$$1.83 < nd < 1.95 \quad (6b)$$

$$4.3 < f3/fW < 5.5 \quad (7b)$$

$$1.5 < D2/D3 < 3.5 \quad (8b)$$

Subsequently, preferred configuration in the respective examples other than those described above will be described.

The first lens unit L1 preferably consists of three lenses including a negative lens. In a case where the lens system is of a wide field angle type, since the outer diameter of the first lens unit L1 is determined by the off-axis ray, the more advantage is obtained for the reduction in size of the entire system with the lesser number of the lenses which constitute the first lens unit L1. In order to achieve the high zoom ratio, if the number of lenses which constitute the first lens unit L1 is too small, corrections of the spherical aberration and the axial chromatic aberration may become difficult. Therefore, in order to achieve the high wide field angle and the high zoom ratio, the first lens unit L1 preferably consists of three lenses including a negative lens.

More specifically, it is preferable to constitute the first lens unit L1 with the negative lens, the positive lens, and the positive lens in this order from the object side to the image side. The second lens unit L2 preferably has the negative lens, the negative lens, and the positive lens from the object side to the image side. By configuring the second lens unit L2 which moves in association with the zooming operation in this manner, variations of the magnification chromatic aberration in association with the zooming operation may easily be inhibited. The third lens unit L3 following the second lens unit L2 has a positive refraction index.

At the wide angle end, an axial light flux is transformed into a diffusing light flux after the passage of the second lens unit L2 having a negative refractive power. However, with the third lens unit following the second lens unit L2 having a positive refractive power, the light flux may be provided with a convergent effect and reduction of the effective diameter of the lenses of the rear lens group may easily be achieved. The third lens unit L3 preferably has a cemented lens including the positive lens, the negative lens, the negative lens, and the positive lens from the object side.

This configuration is referred to as so-called Tesser type which is a triplet type lens system added with one more lens, which allows easy fine-adjustment of Petzval sum by adding one lens to the triplet configuration. Accordingly, the flatness of the image plane is made preferable easily for the entire zoom area. The front lens effective diameter of the zoom lens of the positive lead is increased with widening of the field angle, and hence the reduction in size becomes difficult. However, by limiting the number of lenses which constitute the first lens unit and premising of an electronic aberration correction allowing a distortion aberration to some extent, the reduction in size against the widening of the field angle.

Accordingly, when applying the zoom lens of an embodiment of the invention to the image pickup apparatus having a solid-state image pickup device, the distortion aberration may be electrically corrected. In this configuration, the various aberrations other than the distortion aberration are desirably corrected and the secondary spectrum of the axial chromatic aberration caused by the increase in zoom ratio is corrected, so that a compact zoom lens having a high zoom ratio, a wide field angle, and a high performance is obtained.

Figure 11:
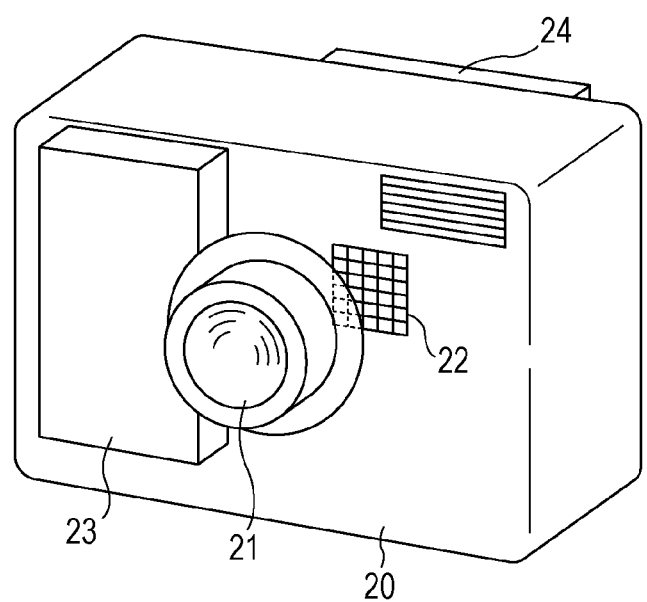
FIG. 11 is a schematic drawing illustrating a principal portion of an image pickup apparatus of the invention.

Subsequently, referring now to FIG. 11, an embodiment of a digital camera (image pickup apparatus) having the zoom lens according to an embodiment of the invention used as a photographic optical system will be described. In FIG. 11, reference numeral 20 designates a digital camera body, reference numeral 21 designates a photographic optical system composed of the zoom lens of the respective examples described above, and reference numeral 22 designates an image pickup device such as a CCD configured to receive an object image by the photographic optical system 21. Reference numeral 23 designates a recording unit configured to record an object image received by the image pickup device 22, and reference numeral 24 designates a finder configured to observe an object image displayed on the display device, mot illustrated.

The above-described display device is composed of a liquid crystal panel or the like, and the image of the object formed on the image pickup device 22 is displayed. By applying the zoom lens of an embodiment of the invention to the digital camera, compact optical equipment having a high optical performance is realized. The zoom lenses of the respective examples may be applied to photographic optical systems such as video cameras or mirror-less single-lens reflex cameras having no quick return mirror in the same manner.

Detailed numerical value data of numerical value examples 1 to 4 corresponding to Examples 1 to 4 will be shown below. In the respective numerical examples, reference sign i designates the number of the plane counted from the object side. Reference sign ri designates a radius of curvature of an ith optical surface (ith surface). Reference sign di designates an axial distance between the ith surface and the (i+1)th surface. Reference signs ndi and vdi are the refraction index and the Abbe number of the material of the ith optical member with respect to the d line, respectively. Two surfaces closest to the image correspond to a glass block G. The aspherical shape is expressed by $$X = \frac{\frac{H^2}{R}}{1 + \sqrt{1 - (1+K)\left(\frac{H}{R}\right)^2}} + A3H^3 + A4H^4 + A5H^5 +$$

$$A6H^6 + A7H^7 + A8H^8 + A9H^9 + A10H^{10} + A12H^{12}$$

where an X-axis extends in the direction of optical axis, an H-axis extends in the vertical direction with respect to the optical axis, and the direction of travel of light is positive, R is a paraxial radius of curvature, K is a conical constant, and A4 to A12 are aspherical constants, respectively.

Asterisk * means a surface having an aspherical shape. The term "e-x" designates $10^{-x}$. Reference sign BF designates a back focus and indicates the distance from the glass block G. Relationships between the respective conditional expressions and the numerical examples described above are shown in Table.

Numerical Example 1

| | Unit mm | | | |
|---|---|---|---|---|
| | Plane Data | | | |
| Plane Number | r | d | nd | vd |
| 1 | 119.576 | 1.00 | 1.83400 | 37.2 |
| 2 | 51.419 | 5.60 | 1.43875 | 94.9 |
| 3 | −147.300 | 0.18 | | |
| 4 | 44.379 | 3.50 | 1.59282 | 68.6 |
| 5 | 180.498 | (Variable) | | |
| 6* | 288.112 | 0.70 | 1.88300 | 40.8 |
| 7* | 8.444 | 4.74 | | |
| 8 | −36.488 | 0.50 | 1.80400 | 46.6 |
| 9 | 29.602 | 0.20 | | |
| 10 | 16.959 | 2.10 | 1.94595 | 18.0 |
| 11 | 84.370 | (Variable) | | |
| 12(Aperture) | ∞ | (Variable) | | |
| 13* | 10.061 | 3.00 | 1.55332 | 71.7 |
| 14* | −71.895 | 2.41 | | |
| 15 | 64.971 | 0.50 | 1.64769 | 33.8 |
| 16 | 11.608 | 0.30 | | |
| 17 | 16.053 | 0.50 | 1.80400 | 46.6 |
| 18 | 8.534 | 2.65 | 1.48749 | 70.2 |
| 19 | −27.107 | 0.30 | | |
| 20(Mechanical Stop) | ∞ | (Variable) | | |
| 21 | 62.247 | 0.50 | 1.48749 | 70.2 |
| 22 | 26.036 | (Variable) | | |
| 23 | 22.969 | 2.40 | 1.74950 | 35.3 |
| 24 | −28.878 | 0.50 | 1.94595 | 18.0 |
| 25 | −191.214 | (Variable) | | |
| 26 | ∞ | 0.80 | 1.51633 | 64.1 |
| 27 | ∞ | | | |
| Image Plane | ∞ | | | |

| Aspherical Surface Data |
|---|

6th surface

K = −9.14422e+003 A4 = 2.34814e−005 A6 = 9.69906e−008
A8 = −5.04619e−009 A10 = 2.35248e−011 A12 = 3.48194e−014
7th surface K = 3.26999e−002 A4 = −4.15397e−005 A6 = 1.45953e−006
A8 = −1.43685e−008 A10 = −1.78519e−010 A12 = −4.13256e−012
13th surface K = −2.41375e−001 A4 = −3.45832e−005 A6 = 2.31336e−007
A8 = −8.42476e−009 A10 = 2.62605e−010

-continued

| Unit mm |
|---|

14th surface

K = 1.13438e+002 A4 = 1.01182e−004 A6 = 9.37832e−007

| Various Data Zoom Ratio 48.37 | | | |
|---|---|---|---|
| | Wide Angle | Intermediate | Zoom |
| Focal Length | 4.30 | 13.31 | 208.00 |
| F number | 2.87 | 5.00 | 7.07 |
| Angle of View | 37.77 | 16.23 | 1.07 |
| Image Height | 3.33 | 3.88 | 3.88 |
| Total Length of Lenses | 94.61 | 94.08 | 138.53 |
| BF | 1.00 | 1.00 | 1.00 |
| d5 | 0.78 | 17.42 | 63.13 |
| d11 | 34.14 | 13.08 | 1.03 |
| d12 | 10.29 | 3.45 | −0.50 |
| d20 | 2.19 | 2.25 | 7.47 |
| d22 | 4.80 | 6.51 | 25.90 |
| d25 | 9.05 | 17.99 | 8.12 |

| Data on Zoom Lens Group | | |
|---|---|---|
| Group | Start Plane | Focal Length |
| 1 | 1 | 80.24 |
| 2 | 6 | −9.34 |
| 3 | 12 | ∞ |
| 4 | 13 | 19.93 |
| 5 | 21 | −92.22 |
| 6 | 23 | 32.44 |
| 7 | 26 | ∞ |

Numerical Example 2

| | Unit mm | | | |
|---|---|---|---|---|
| | Plane Data | | | |
| Plane Number | r | d | nd | vd |
| 1 | 118.968 | 1.00 | 1.83400 | 37.2 |
| 2 | 51.380 | 5.65 | 1.43875 | 94.9 |
| 3 | −145.612 | 0.18 | | |
| 4 | 44.412 | 3.60 | 1.59282 | 68.6 |
| 5 | 180.136 | (Variable) | | |
| 6* | 312.978 | 0.70 | 1.88300 | 40.8 |
| 7* | 8.452 | 4.72 | | |
| 8 | −36.104 | 0.50 | 1.80400 | 46.6 |
| 9 | 28.730 | 0.20 | | |
| 10 | 16.966 | 2.00 | 1.94595 | 18.0 |
| 11 | 86.851 | (Variable) | | |
| 12(Aperture) | ∞ | (Variable) | | |
| 13* | 10.061 | 3.05 | 1.55332 | 71.7 |
| 14* | −71.895 | 2.09 | | |
| 15 | 62.759 | 0.50 | 1.64769 | 33.8 |
| 16 | 11.893 | 0.28 | | |
| 17 | 16.708 | 0.50 | 1.80400 | 46.6 |
| 18 | 8.677 | 2.50 | 1.48749 | 70.2 |
| 19 | −24.962 | 0.30 | | |
| 20 | 190.183 | 0.50 | 1.43875 | 94.9 |
| 21 | 35.988 | 0.50 | | |
| 22(Mechanical Stop) | ∞ | (Variable) | | |
| 23 | 24.738 | 2.50 | 1.74950 | 35.3 |
| 24 | −26.797 | 0.50 | 1.94595 | 18.0 |
| 25 | −148.041 | (Variable) | | |
| 26 | ∞ | 0.80 | 1.51633 | 64.1 |
| 27 | ∞ | | | |
| Image Plane | ∞ | | | |

-continued

Unit mm

Aspherical Surface Data

6th surface

K = −1.98055e+004 A4 = 2.87252e−005 A6 = 1.63101e−007
A8 = −8.77304e−009 A10 = 4.35048e−011 A12 = 8.01470e−014

7th surface

K = 1.02030e−001 A4 = −7.75234e−005 A6 = 2.87946e−006
A8 = −4.23726e−008 A10 = −5.29929e−010 A12 = −1.95533e−012

13th surface

K = −1.27865e−001 A4 = −1.27208e−005 A6 = −1.13483e−006
A8 = 4.58871e−009 A10 = 2.62605e−010

14th surface

K = 7.20097e+001 A4 = 1.32020e−004 A6 = −6.91235e−007

Various Data
Zoom Ratio 48.38

| | Wide Angle | Intermediate | Zoom |
|---|---|---|---|
| Focal Length | 4.30 | 13.09 | 208.05 |
| F number | 2.87 | 5.00 | 7.07 |
| Angle of View | 37.77 | 16.49 | 1.07 |
| Image Height | 3.33 | 3.88 | 3.88 |
| Total Length of Lenses | 95.04 | 94.82 | 139.16 |
| BF | 1.00 | 1.00 | 1.00 |
| d5 | 0.78 | 17.45 | 63.11 |
| d11 | 34.11 | 12.46 | 0.89 |
| d12 | 10.06 | 4.14 | −0.50 |
| d22 | 7.60 | 9.50 | 33.82 |
| d25 | 8.92 | 17.70 | 8.28 |

Data on Zoom Lens Group

| Group | Start Plane | Focal Length |
|---|---|---|
| 1 | 1 | 79.91 |
| 2 | 6 | −9.23 |
| 3 | 12 | ∞ |
| 4 | 13 | 22.13 |
| 5 | 23 | 34.06 |
| 6 | 26 | ∞ |

Numerical Example 3

Unit mm

Plane Data

| Plane Number | r | d | nd | vd |
|---|---|---|---|---|
| 1 | 118.790 | 1.00 | 1.83400 | 37.2 |
| 2 | 51.310 | 5.62 | 1.43875 | 94.9 |
| 3 | −145.430 | 0.18 | | |
| 4 | 44.310 | 3.55 | 1.59282 | 68.6 |
| 5 | 180.001 | (Variable) | | |
| 6* | 332.325 | 0.70 | 1.88300 | 40.8 |
| 7* | 8.486 | 4.62 | | |
| 8 | −35.399 | 0.50 | 1.80400 | 46.6 |
| 9 | 27.806 | 0.20 | | |
| 10 | 16.853 | 2.00 | 1.94595 | 18.0 |
| 11 | 89.438 | (Variable) | | |
| 12(Aperture) | ∞ | (Variable) | | |
| 13* | 10.061 | 3.22 | 1.55332 | 71.7 |
| 14* | −71.895 | 1.97 | | |
| 15 | 58.564 | 0.50 | 1.64769 | 33.8 |
| 16 | 11.811 | 0.28 | | |
| 17 | 16.608 | 0.50 | 1.80400 | 46.6 |
| 18 | 8.596 | 2.46 | 1.48749 | 70.2 |
| 19 | −27.078 | 0.30 | | |
| 20 | −540.752 | 0.50 | 1.43875 | 94.9 |
| 21 | 36.319 | 0.50 | | |
| 22(Mechanical Stop) | ∞ | (Variable) | | |
| 23 | 200.000 | 1.50 | 1.48749 | 70.2 |
| 24 | −200.000 | (Variable) | | |
| 25 | 25.254 | 2.50 | 1.74950 | 35.3 |
| 26 | −27.317 | 0.50 | 1.94595 | 18.0 |
| 27 | −155.218 | (Variable) | | |
| 28 | ∞ | 0.80 | 1.51633 | 64.1 |
| 29 | ∞ | | | |
| Image Plane | ∞ | | | |

Aspherical Surface Data

6th surface

K = −2.05910e+004 A4 = 1.58190e−005 A6 = 3.17106e−007
A8 = −9.00913e−009 A10 = 4.15788e−011 A12 = 6.89800e−014

7th surface

K = 2.35040e−002 A4 = −6.33194e−005 A6 = 2.72212e−006
A8 = −2.88296e−008 A10 = −6.46788e−010 A12 = 3.29283e−012

13th surface

K = −4.36459e−001 A4 = −4.15458e−006 A6 = −6.98365e−008
A8 = −1.61017e−008 A10 = 2.62605e−010

14th surface

K = 1.42167e+002 A4 = 1.17667e−004 A6 = 5.97043e−007

Various Data
Zoom Ratio 48.33

| | Wide Angle | Intermediate | Zoom |
|---|---|---|---|
| Focal Length | 4.30 | 13.22 | 208.03 |
| F number | 2.87 | 5.00 | 7.07 |
| Angle of View | 37.75 | 16.34 | 1.07 |
| Image Height | 3.33 | 3.88 | 3.88 |
| Total Length of Lenses | 96.08 | 95.89 | 140.54 |
| BF | 1.00 | 1.00 | 1.00 |
| d5 | 0.78 | 17.44 | 62.98 |
| d11 | 34.44 | 12.62 | 0.89 |
| d12 | 9.94 | 3.83 | −0.50 |
| d22 | 1.89 | 2.36 | 2.76 |
| d24 | 5.10 | 6.55 | 30.66 |
| d27 | 9.02 | 18.18 | 8.84 |

Data on Zoom Lens Group

| Group | Start Plane | Focal Length |
|---|---|---|
| 1 | 1 | 79.72 |
| 2 | 6 | −9.18 |
| 3 | 12 | ∞ |
| 4 | 13 | 23.55 |
| 5 | 23 | 205.38 |
| 6 | 25 | 34.97 |
| 7 | 28 | ∞ |

Numerical Example 4

Unit mm

Plane Data

| Plane Number | r | d | nd | vd |
|---|---|---|---|---|
| 1 | 109.862 | 0.50 | 1.88300 | 40.8 |
| 2 | 49.564 | 6.70 | 1.59282 | 68.6 |
| 3 | −1412.227 | 0.18 | | |
| 4 | 45.784 | 4.00 | 1.43875 | 94.9 |
| 5 | 223.283 | (Variable) | | |
| 6* | 685.261 | 0.50 | 1.88300 | 40.8 |
| 7* | 8.346 | 5.69 | | |
| 8 | −43.814 | 0.50 | 1.77250 | 49.6 |
| 9 | 28.099 | 0.20 | | |
| 10 | 17.969 | 2.40 | 2.00178 | 19.3 |
| 11 | 77.754 | (Variable) | | |
| 12 (Aperture) | ∞ | (Variable) | | |

-continued

Unit mm

| | | | | |
|---|---|---|---|---|
| 13* | 9.226 | 3.00 | 1.55332 | 71.7 |
| 14* | −94.279 | 1.25 | | |
| 15 | 40.039 | 0.50 | 1.64769 | 33.8 |
| 16 | 10.107 | 0.40 | | |
| 17 | 12.963 | 0.50 | 1.80400 | 46.6 |
| 18 | 7.370 | 3.45 | 1.48749 | 70.2 |
| 19 | −25.998 | 0.30 | | |
| 20 (Mechanical Stop) | ∞ | (Variable) | | |
| 21 | 48.687 | 0.50 | 1.48749 | 70.2 |
| 22 | 16.141 | (Variable) | | |
| 23 | 21.359 | 2.05 | 1.78590 | 44.2 |
| 24 | −48.900 | 0.50 | 1.94595 | 18.0 |
| 25 | −407.414 | (Variable) | | |
| 26 | ∞ | 0.80 | 1.51633 | 64.1 |
| 27 | ∞ | | | |
| Image Plane | ∞ | | | |

Aspherical Surface Data

6th surface

K = 3.17593e+003 A4 = 1.23111e−005 A6 = 3.78879e−008
A8 = −8.77141e−011

7th surface

K = −8.83033e−004 A4 = −1.34925e−005 A6 = −3.39607e−007
A8 = −5.98988e−009

13th surface

K = −2.95489e−001 A4 = −7.85697e−005 A6 = −6.47947e−007
A8 = −1.51573e−008 A10 = 2.62605e−010

14th surface

K = −1.48533e+002 A4 = −9.95689e−006 A6 = −7.51143e−007

Various Data
Zoom Ratio 66.08

| | Wide Angle | Intermediate | Zoom |
|---|---|---|---|
| Focal Length | 3.63 | 14.22 | 240.00 |
| F number | 2.87 | 5.00 | 8.50 |
| Angle of View | 41.87 | 15.24 | 0.93 |
| Image Height | 3.25 | 3.88 | 3.88 |
| Total Length of Lenses | 94.06 | 94.91 | 160.39 |
| BF | 1.00 | 1.00 | 1.00 |
| d5 | 0.50 | 19.82 | 76.77 |
| d11 | 27.68 | 9.14 | 0.98 |
| d12 | 17.41 | 2.50 | 0.03 |
| d20 | 1.63 | 2.09 | 14.83 |
| d22 | 2.76 | 7.08 | 28.23 |
| d25 | 9.16 | 19.36 | 4.63 |

Data on Zoom Lens Group

| Group | Start Plane | Focal Length |
|---|---|---|
| 1 | 1 | 98.00 |
| 2 | 6 | −9.32 |
| 3 | 12 | ∞ |
| 4 | 13 | 17.90 |
| 5 | 21 | −49.78 |
| 6 | 23 | 27.88 |
| 7 | 26 | ∞ |

Numerical Example 5

Unit mm

Plane Data

| Plane Number | r | d | nd | vd |
|---|---|---|---|---|
| 1 | 86.882 | 0.50 | 1.91082 | 35.3 |
| 2 | 51.691 | 6.00 | 1.59282 | 68.6 |
| 3 | 963.636 | 0.18 | | |
| 4 | 49.891 | 4.00 | 1.43875 | 94.9 |
| 5 | 183.284 | (Variable) | | |
| 6* | 726.742 | 0.50 | 1.88300 | 40.8 |
| 7* | 8.360 | 5.72 | | |
| 8 | −44.450 | 0.50 | 1.77250 | 49.6 |
| 9 | 28.115 | 0.20 | | |
| 10 | 17.990 | 2.40 | 2.00178 | 19.3 |
| 11 | 74.295 | (Variable) | | |
| 12(Aperture) | ∞ | (Variable) | | |
| 13* | 9.227 | 3.00 | 1.55332 | 71.7 |
| 14* | −103.260 | 1.27 | | |
| 15 | 39.464 | 0.50 | 1.64769 | 33.8 |
| 16 | 10.110 | 0.41 | | |
| 17 | 12.947 | 0.50 | 1.80400 | 46.6 |
| 18 | 7.367 | 3.45 | 1.48749 | 70.2 |
| 19 | −25.430 | 0.30 | | |
| 20(Mechanical Stop) | ∞ | (Variable) | | |
| 21 | 55.380 | 0.50 | 1.48749 | 70.2 |
| 22 | 16.631 | (Variable) | | |
| 23 | 21.959 | 2.40 | 1.78590 | 44.2 |
| 24 | −41.142 | 0.50 | 1.94595 | 18.0 |
| 25 | −193.394 | (Variable) | | |
| 26 | ∞ | 0.80 | 1.51633 | 64.1 |
| 27 | ∞ | | | |
| Image Plane | ∞ | | | |

Aspherical Surface Data

6th surface

K = 3.42120e+003 A4 = 9.83645e−006 A6 = 4.89616e−008
A8 = −1.11774e−010

7th surface

K = −2.22371e−002 A4 = −1.79532e−005 A6 = −1.75865e−007
A8 = −6.59089e−009

13th surface

K = −3.59693e−001 A4 = −7.27635e−005 A6 = −5.90525e−007
A8 = −1.58851e−008 A10 = 2.62605e−010

14th surface

K = −1.82579e+002 A4 = −1.38626e−005 A6 = −8.27199e−007

Various Data
Zoom Ratio 66.01

| | Wide Angle | Intermediate | Zoom |
|---|---|---|---|
| Focal Length | 3.64 | 14.27 | 240.13 |
| F number | 2.87 | 5.00 | 8.45 |
| Angle of View | 41.82 | 15.20 | 0.92 |
| Image Height | 3.25 | 3.88 | 3.88 |
| Total Length of Lenses | 94.11 | 94.86 | 160.30 |
| BF | 1.00 | 1.00 | 1.00 |
| d5 | 0.50 | 20.23 | 76.83 |
| d11 | 27.83 | 9.59 | 0.96 |
| d12 | 17.51 | 1.93 | 0.34 |
| d20 | 1.37 | 1.96 | 14.87 |
| d22 | 3.36 | 7.36 | 28.38 |
| d25 | 8.91 | 19.16 | 4.29 |

Data on Zoom Lens Group

| Group | Start Plane | Focal Length |
|---|---|---|
| 1 | 1 | 99.00 |
| 2 | 6 | −9.27 |
| 3 | 12 | ∞ |
| 4 | 13 | 17.88 |
| 5 | 21 | −48.96 |
| 6 | 23 | 27.25 |
| 7 | 26 | ∞ |

TABLE

| | | Conditional Expression | | further preferable | | still further preferable | | Example 1 | Example 2 | Example 3 | Example 4 | Example 5 |
|---|---|---|---|---|---|---|---|---|---|---|---|---|
| | | lower limit value | upper limit value | lower limit value | upper limit value | lower limit value | upper limit value | | | | | |
| Conditional Expression 1 | vd | 35.0 | 50.0 | 35.1 | 49.8 | 35.2 | 49.7 | 37.2 | 37.2 | 37.2 | 40.8 | 35.3 |
| Conditional Expression 2 | θgF | 0.52 | | 0.53 | | 0.54 | | 0.5775 | 0.5775 | 0.5775 | 0.5667 | 0.5824 |
| Conditional Expression 3 | Expression Value | | | | | | | 0.5805 | 0.5805 | 0.5805 | 0.5732 | 0.5843 |
| Conditional Expression 4 | f1/fW | 18.1 | 27.8 | 18.4 | 27.6 | 18.5 | 27.5 | 18.657 | 18.582 | 18.520 | 27.191 | 27.433 |
| | f1 | | | | | | | 80.236 | 79.914 | 79.718 | 97.999 | 99.001 |
| | fW | | | | | | | 4.301 | 4.301 | 4.304 | 3.604 | 3.609 |
| Conditional Expression 5 | Expression Value | 2.8 | 6.5 | 2.9 | 6.3 | 3.0 | 6.0 | 5.926 | 5.746 | 4.819 | 3.049 | 3.024 |
| | β2W | | | | | | | −0.140 | −0.139 | −0.139 | −0.108 | −0.107 |
| | β2T | | | | | | | −2.150 | −2.286 | −2.269 | −1.254 | −1.235 |
| | β3W | | | | | | | −0.487 | −0.601 | −0.681 | −0.396 | −0.393 |
| | β3T | | | | | | | −1.263 | −1.718 | −2.313 | −1.512 | −1.505 |
| Conditional Expression 6 | nd | 1.75 | 2.10 | 1.76 | 2.00 | 1.83 | 1.95 | 1.83400 | 1.83400 | 1.83400 | 1.88300 | 1.91082 |
| Conditional Expression 7 | f3/fW | 3.5 | 6.5 | 4.0 | 6.0 | 4.3 | 5.5 | 4.634 | 5.145 | 5.472 | 4.966 | 4.953 |
| | f3 | | | | | | | 19.931 | 22.126 | 23.555 | 17.897 | 17.875 |
| Conditional Expression 8 | D2/D3 | 1.0 | 5.0 | 1.2 | 4.5 | 1.5 | 3.5 | 3.319 | 3.419 | 3.466 | 1.590 | 1.590 |
| | D2 | | | | | | | 34.139 | 34.406 | 34.437 | 27.678 | 27.831 |
| | D3 | | | | | | | 10.286 | 10.064 | 9.936 | 17.409 | 17.505 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-026211, filed Feb. 9, 2012, which is hereby incorporated by reference herein in its entirety.

What is claimed is:

1. A zoom lens comprising: a first lens unit having a positive refractive power, a second lens unit having a negative reflective power, a third lens unit having a positive refractive power, and a rear lens group including one or more lens units in this order from an object side to an image side, wherein distances between the respective lens units vary during the zooming operation,
   wherein the first lens unit consists of three lenses including one negative lens, and
   where θgF is a partial dispersion ratio of a material for the negative lens of the first lens unit, vd is an Abbe number of the same, fW is a focal length of the entire system at the wide angle end, and f1 is a focal length of the first lens unit, conditions of $$35.0 < vd < 50.0$$

$$0.52 < \theta gF$$

$$\theta gF < -0.00203 \times vd + 0.656$$

$$18.1 < f1/fW < 27.8$$

are satisfied.

2. The zoom lens according to claim 1, wherein where β2W is a lateral magnification of the second lens unit at a wide angle end, β2T is a lateral magnification of the second lens unit at a telephoto end, β3W is a lateral magnification of the third lens unit at the wide angle end, and β3T of a lateral magnification of the third lens unit at the telephoto end, a condition of $$2.8 < (\beta 2T \cdot \beta 3W)/(\beta 2W \cdot \beta 3T) < 6.5$$

is satisfied.

3. The zoom lens according to claim 1, wherein where f3 is a focal length of the third lens unit, a condition of $$3.5 < f3/fW < 6.5$$

is satisfied.

4. The zoom lens according to claim 1, wherein the first lens unit includes a negative lens, a positive lens, and a positive lens in this order from the object side to the image side.

5. The zoom lens according to claim 1, wherein where nd is a refractive index of the material of the negative lens of the first lens unit, a condition of $$1.75 < nd < 2.10$$

is satisfied.

6. The zoom lens according to claim 1, comprising an aperture stop between the second lens unit and the third lens unit.

7. The zoom lens according to claim 1, wherein the first lens unit, the second lens unit, and the third lens unit move during the zooming operation.

8. The zoom lens according to claim 1, comprising:
   an aperture stop configured to move along a locus different from other lens units during the zooming operation,
   wherein the aperture stop is arranged between the second lens unit and the third lens unit.

9. The zoom lens according to claim 1, comprising:
   an aperture stop arranged between the second lens unit and the third lens unit, and where the distance between a lens surface of the second lens unit on the image side and the aperture stop at the wide angle end is defined as D2, and the distance between the aperture stop and a lens surface of the third lens unit on the object side at the wide angle end is defined as D3, a condition of $$1.0 < D2/D3 < 5.0$$

is satisfied.

10. The zoom lens according to claim 1, wherein the first lens unit moves to the image side and then moves to the object side during a zooming operation from the wide angle end to the telephoto end.

11. The zoom lens according to claim 1, wherein the lens unit closest to the image moves to the object side during a focusing operation from an object at infinity to a near object.

12. The zoom lens according to claim 1, wherein the rear lens group includes a fourth lens unit having a positive refractive power.

13. The zoom lens according to claim 1, wherein the rear lens group includes a fourth lens unit having a negative refractive power and a fifth lens unit having a positive refractive power.

14. The zoom lens according to claim 1, wherein the rear lens group includes a fourth lens unit having a positive refractive power and a fifth lens unit having a positive refractive power.

15. An image pickup apparatus comprising:
a zoom lens according to claim 1; and
a photoelectric conversion device configured to receive an image formed by the zoom lens.

* * * * *